United States Patent

Iwamura et al.

[11] Patent Number: 5,905,698
[45] Date of Patent: May 18, 1999

[54] STORAGE MEDIA LOADING AND UNLOADING CONTROLLING SYSTEM

[75] Inventors: Norihiko Iwamura; Kazuhiko Inoue, both of Kawasaki, Japan

[73] Assignee: Fujitsu Limited, Kawasaki, Japan

[21] Appl. No.: 08/893,705

[22] Filed: Jul. 11, 1997

[30] Foreign Application Priority Data

Dec. 3, 1996 [JP] Japan .................................. 8-323123

[51] Int. Cl.⁶ .................................................. G11B 17/22
[52] U.S. Cl. ................................................. 369/34; 369/36
[58] Field of Search ............................. 369/34, 30, 36, 369/37, 38, 39; 711/100, 111

[56] References Cited

U.S. PATENT DOCUMENTS

| | | | |
|---|---|---|---|
| 5,345,350 | 9/1994 | Ellis et al. | 360/92 |
| 5,357,495 | 10/1994 | Solhjell | 369/34 |
| 5,502,697 | 3/1996 | Taki | 369/34 |
| 5,604,721 | 2/1997 | Asano | 369/34 |
| 5,638,347 | 6/1997 | Baca et al. | 369/34 |
| 5,657,301 | 8/1997 | Toshikawa et al. | 369/34 |

*Primary Examiner*—Tan Dinh
*Attorney, Agent, or Firm*—Staas & Halsey

[57] ABSTRACT

If a user operates a DIP switch on an operator panel of a library apparatus, and sets a mass loading mode, a carrying unit repeats operations for loading a storage medium from a loading/unloading aperture to a slot. In a mass unloading mode, the carrying unit repeats operations for carrying the storage medium from the slot to the loading/unloading aperture. Consequently, even if a door for loading/unloading a mass of storage media is not arranged, the equivalent capability is implemented.

14 Claims, 32 Drawing Sheets

| ITEM | NAME | ON | OFF | REMARK | |
|---|---|---|---|---|---|
| (1) | TERMINATING RESISTOR | TERMINATING RESISTOR ENABLED | TERMINATING RESISTOR DISABLED | | bit 1 |
| (2) | TEST MODE SETTING | TEST MODE | NORMAL OPERATION MODE | | bit 2 |
| (3) | LOAD | CTG LOADING | NORMAL OPERATION MODE | DIPSW 1 | bit 3 |
| (4) | UNLOAD | CTG UNLOADING | NORMAL OPERATION MODE | | bit 4 |
| (5) | SPINDLE AUTOMATIC HALT MODE | AUTOMATIC HALT WHEN ACCESS IS NOT MADE -ODD | NORMAL OPERATION MODE | | bit 5 |
| (6) | MAC MODE | MACINTOSH CONNECTABLE | MACINTOSH UNCONNECTABLE | | bit 6 |
| (7) | CLEANING | CLEANING | NORMAL OPERATION MODE | | bit 7 |
| (8) | SCAM CAPABILITY | SCAM CAPABILITY ENABLED | SCAM CAPABILITY DISABLED | | bit 8 |
| (9) | DEVICE TYPE MODE | OPTICAL MEMORY DEVICE | DIRECT ACCESS DEVICE | | bit 1 |
| (10) | VERIFY MODE | DOES NOT VERIFY AT WRITE | VERIFY AT WRITE | DIPSW 2 | bit 2 |
| (11) | SPECIFICATION TYPE OF LOGIC | SCSI-2 SPECIFICATION | SCSI-1 SPECIFICATION | | bit 3 |
| (12) | RESERVED 1 | UNDEFINED | UNDEFINED | | bit 4 |
| (13) | RESERVED 2 | UNDEFINED | UNDEFINED | | bit 5 |

FIG. 14

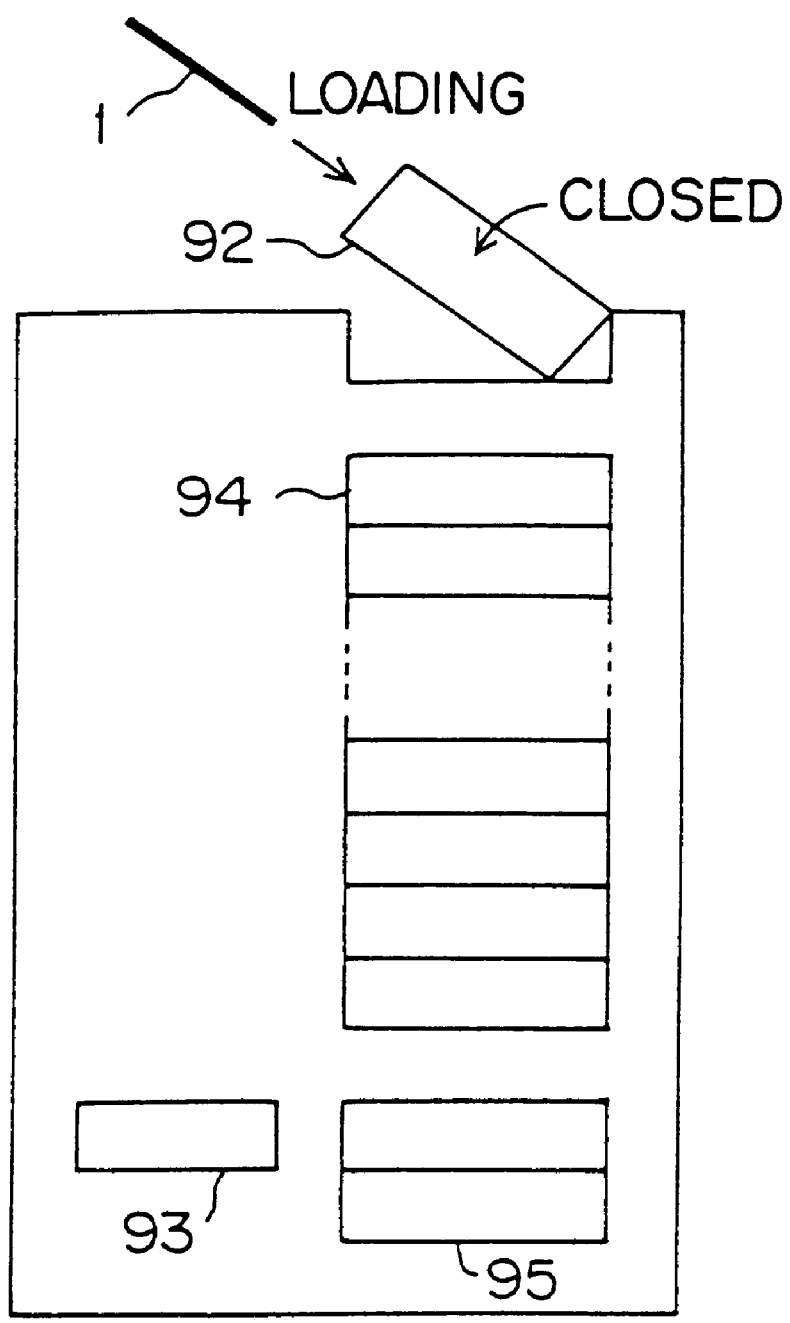
F I G. 20

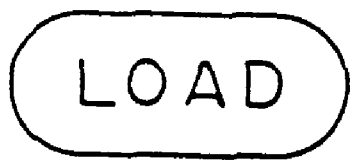 : MASS LOADING OF CARTRIDGES
 : MASS UNLOADING OF CARTRIDGES
FIG. 30

STORAGE MEDIA LOADING AND UNLOADING CONTROLLING SYSTEM

BACKGROUND OF THE INVENTION

1. Field of the Invention

The present invention relates to a library device for automatically keeping, recording data in, reproducing data from, etc. storage media, and relates to a controlling device for controlling loading/unloading operations of a large number of storage media and method thereof.

2. Description of the Related Art

A library device today is used as, for example, a jukebox, and automatically performs loading/unloading, keeping a storage medium, recording data to, reproducing data from, etc. An optical disk, CD-ROM (Compact Disk-Read Only Memory), MT (Magnetic Tape), etc., is used as the storage medium.

A library device normally comprises a cartridge access station (CAS) for loading/unloading a storage medium cartridge, a plurality of slots for keeping storage media, drive unit for recording/reproducing data for a storage medium, and an accessor for carrying a storage medium between the above described components. A cartridge loaded into the CAS from a loading/unloading aperture is carried to a slot or the drive unit by the accessor.

FIG. 1 exemplifies a conventional optical disk library device. Once a user purchases an optical disk library device, he or she will usually desire to load a number of optical disk cartridges 1 as an initial operation. The library device shown in FIG. 1 mechanically comprises a door 3 for loading/unloading a number of optical disk cartridges 1, separately from a loading/unloading aperture 2.

To load a large number of optical disk cartridges 1, a user opens the door 3 and manually inserts optical disk cartridges one by one into empty slots 4 for holding cartridges. To unload the optical disk cartridges 1, the user opens the door 3 and takes out the optical disk cartridges 1 one by one from the slots 4.

Such a mass loading mechanism is suitable for the need of loading a large number of cartridges. Since optical disk cartridges 1 can be sequentially loaded by opening the door 3, operations at an initial use stage can be performed with ease. Because the conventional mass loading mechanism must provide for the operation of the door 3, the structure of a device tends to be complicated. Therefore, it is difficult to reduce its cost.

Additionally, with an optical disk library device which does not comprise such a mass loading mechanism, a user is required to load an optical disk cartridge 1 from the loading/unloading aperture 2. The loaded optical disk cartridge 1 is put into the slot 4 via the CAS and accessor.

At this time, the user must operate a control panel of the library device, or input a command from a host computer connected to the library device each time the user loads an optical disk cartridge 1. Accordingly, if dozens of optical disk cartridges 1 are to be loaded together, the load on the user becomes heavier. This problem also arises in the case in which a large number of optical disk cartridges 1 are unloaded together.

SUMMARY OF THE INVENTION

An object of the present invention is to provide a controlling device for efficiently performing loading/unloading operations of a mass of storage media at low cost in a library device, and a method thereof.

The controlling device according to the present invention is used for a library device storing a plurality of storage media. It comprises a setting unit and a controlling unit.

The setting unit sets at least either of a mass loading mode and a mass unloading mode for two or more storage media.

The controlling unit controls the library device in order to successively load two or more storage media when the mass loading mode is set by the setting unit, and controls the library device in order to successively unload two or more storage media when the mass unloading mode is set.

The setting unit is, for example, an operation switch for setting the mass loading/unloading mode, and is arranged on an operator panel of the library device. A user can set the mode by simply operating the switch.

The controlling unit is, for example, an MPU (Micro Processing Unit) included in the library device, and controls a CAS or an accessor by executing the process corresponding to a set mode. The library device sequentially loads storage media into slots in the mass loading mode, while it sequentially unloads the storage media from the slots in the mass unloading mode.

BRIEF DESCRIPTION OF THE DRAWINGS

FIG. 14 is a table showing the definitions of a DIP switch;

FIG. 20 shows an eighth sectional view;

FIG. 30 exemplifies setting switches; and

DESCRIPTION OF THE PREFERRED EMBODIMENTS

Figure 1:
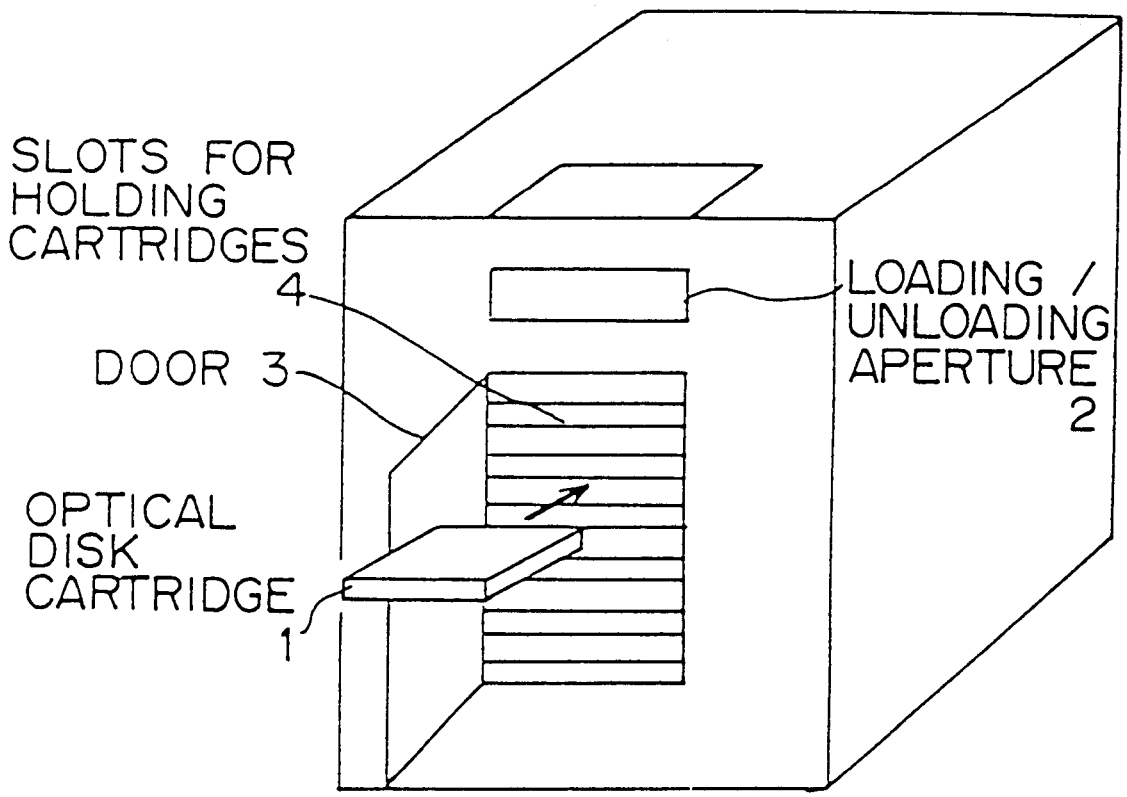
FIG. 1 is a schematic diagram showing a conventional optical disk library device.

Provided below is the explanation about the details of an embodiment according to the present invention, by referring to the drawings.

Figure 2A:
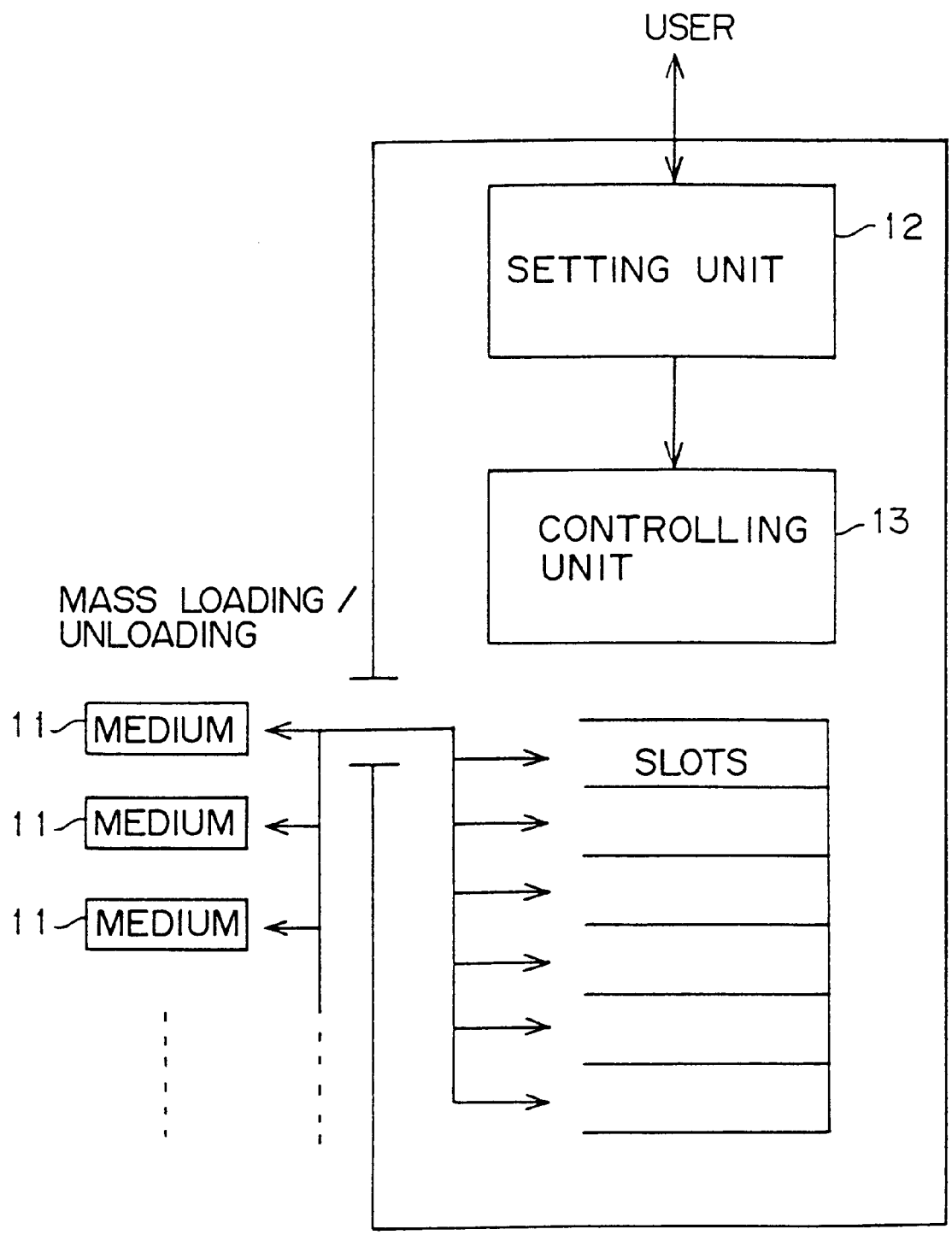
FIG. 2A is a block diagram showing the principle of a controlling device according to the present invention.

FIG. 2A is a block diagram showing the principle of a controlling device according to the present invention. The controlling device shown in FIG. 2A is used for a library device storing a plurality of storage media 11. It comprises a setting unit 12 and a controlling unit 13.

The setting unit 12 sets at least either of a mass loading mode and a mass unloading mode for two or more storage media 11.

The controlling unit 13 controls the library device to successively load two or more storage media 11 when the mass loading mode is set by the setting unit 12, and controls the library device to successively unload two or more storage media 11 when the mass unloading mode is set by the setting unit 12.

The setting unit 12 is, for example, an operation switch for setting the mass loading/unloading mode, and is arranged on an operation panel of the library device. A user can set the mode by simply operating the switch.

The controlling unit 13 is, for example, an MPU (Micro Processing Unit) included in the library device. It controls a CAS or an accessor by performing the process corresponding to a set mode. The library device sequentially loads storage media 11 into slots in the mass loading mode, and sequentially unloads the storage media 11 from the slots in the mass unloading mode.

The use of such a controlling device allows a mass of storage media 11 to be loaded/unloaded without need to arrange a door for loading/unloading a mass of storage media 11. Accordingly, the cost of the arrangement of a door mechanism can be reduced. It is sufficient for a user only to load/unload storage media 11 into/from the library device one after another, thereby reducing a user workload.

Furthermore, since it is no longer needed for a user to operate an external host computer by arranging the setting unit 12 in the library device, the loading/unloading operations can be performed even if the host computer is not operating.

Figure 9:
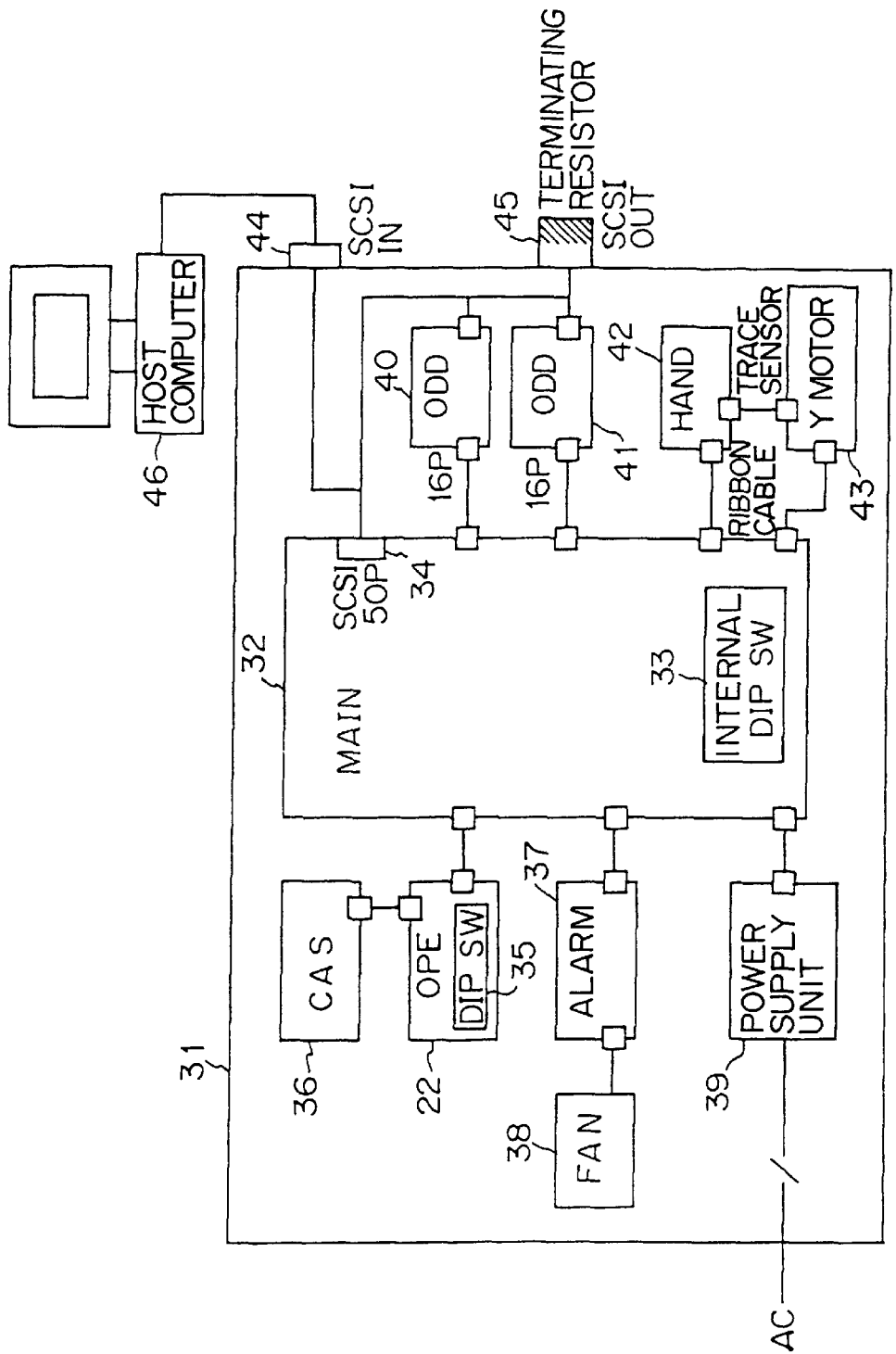
FIG. 9 is a block diagram showing the structure of a library device.

For example, the storage medium 11 shown in FIG. 2A corresponds to the optical disk cartridge 1; the setting unit 12 corresponds to a DIP switch 35 which is shown in FIG. 9 and will be described later; and the controlling unit 13 corresponds to a MAIN board 32 shown in FIG. 9.

In the library device according to the present invention, an operation switch for switching a mode on/off, such as a DIP switch, is arranged on an operator panel. If the device is powered up when the operation switch is set to a predetermined state, the library device automatically opens an input/output (I/O) element such as a CAS, and starts inserting storage media cartridges into empty slots in the device.

If the library device is powered up when the operation switch is set to another state, the library device sequentially unloads cartridges in the device from the I/O element.

As described above, the process for loading/unloading a mass of cartridges can be implemented without arranging a specific mechanism, even in a library device comprising only one I/O element. Because the operation switch is arranged in the library device, the loading/unloading operations of cartridges can be performed without requiring the operations of an external host computer.

Provided first is the explanation about the operations of an optical disk library device according to a first embodiment of the present invention, by referring to FIGS. 2B through 8.

Figure 2B:
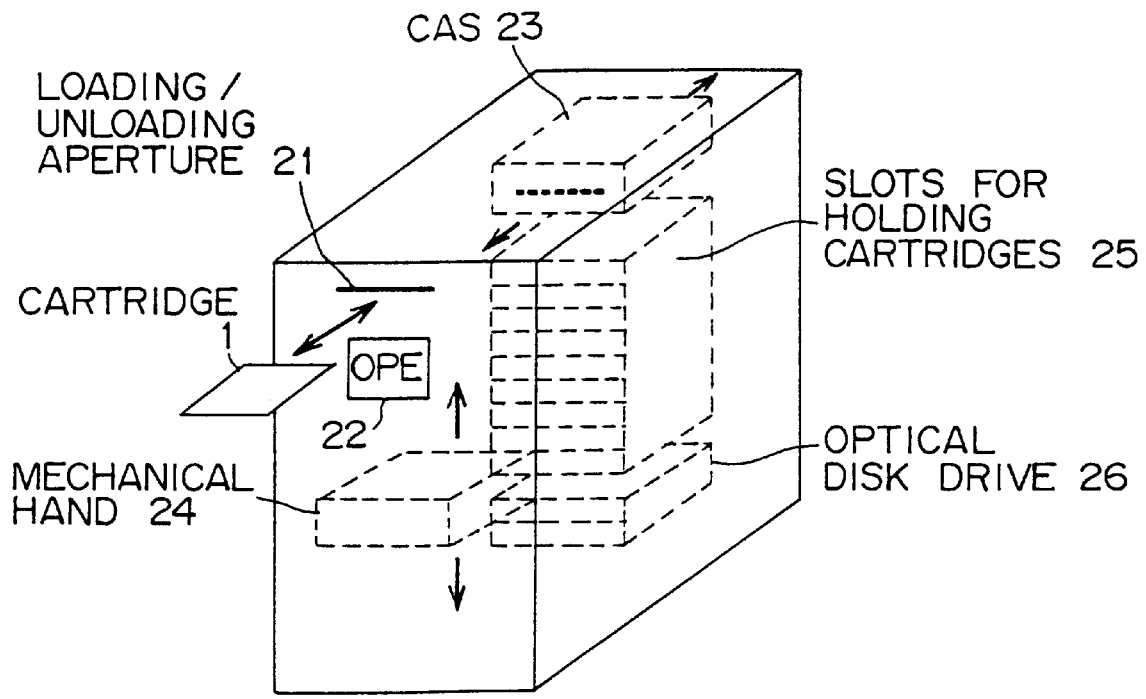
FIG. 2B is a schematic diagram showing a first optical disk library device.

FIG. 2B shows the optical disk library device according to the first embodiment. In this figure, a cartridge loading/unloading aperture 21 and an operator panel (OPE) 22 are arranged on the front of the optical disk library device. A CAS 23, mechanical hand 24, slots for holding cartridges 25, and an optical disk drive 26, are included in the device.

The CAS 23 can move backward and forward. It moves forward when the cartridge 1 is to be loaded/unloaded, and stops immediately adjacent to the loading/unloading aperture 21. The loading/unloading aperture 21 is opened when the CAS 23 is adjacent, and closed when the CAS 23 is not adjacent. The mechanical hand 24 moves upward and downward as part of an accessor, and carries a cartridge 1 between the CAS 23, slots 25, and the optical disk drive 26.

Figure 3:
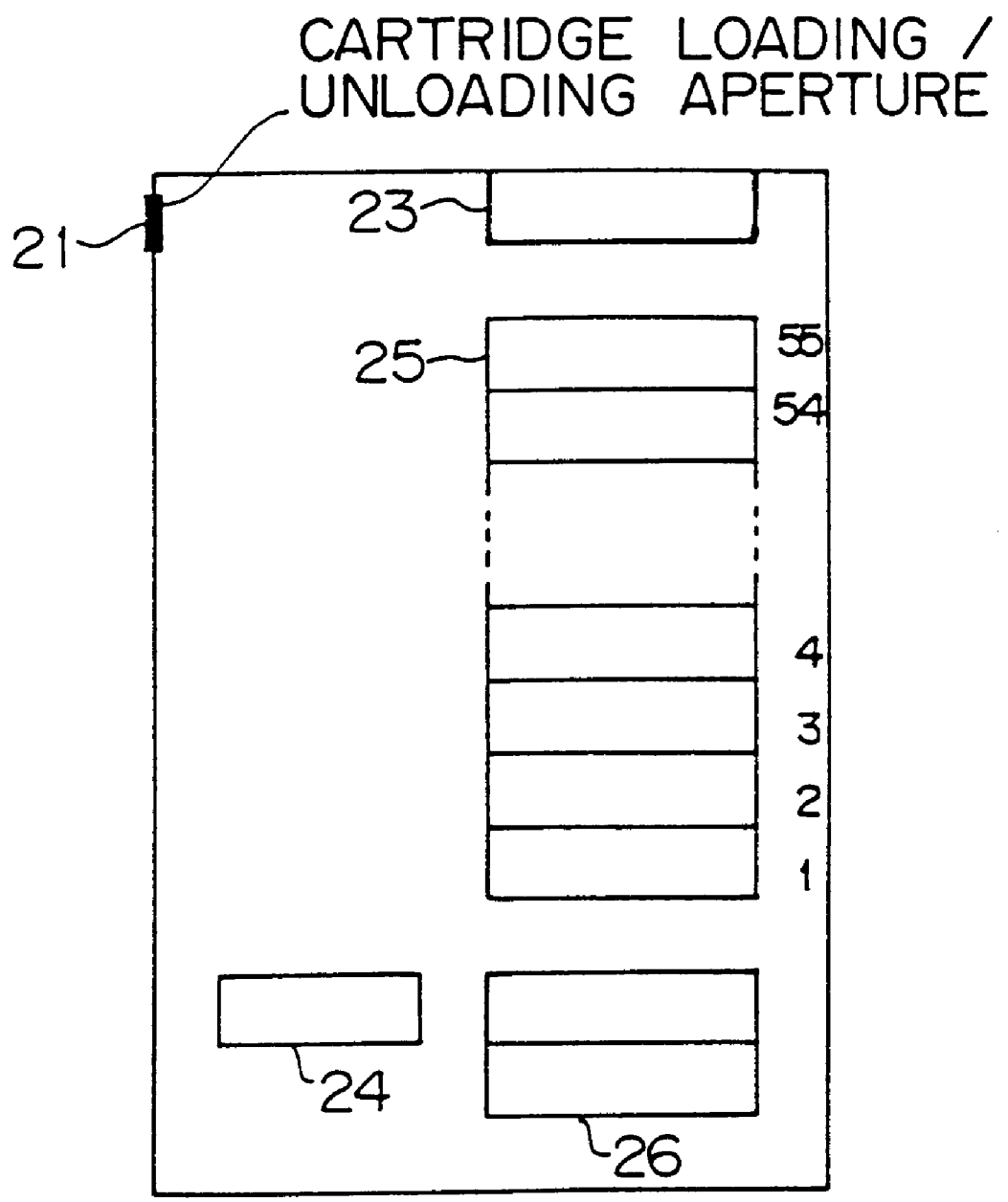
FIG. 3 shows a first sectional view.
Figure 4:
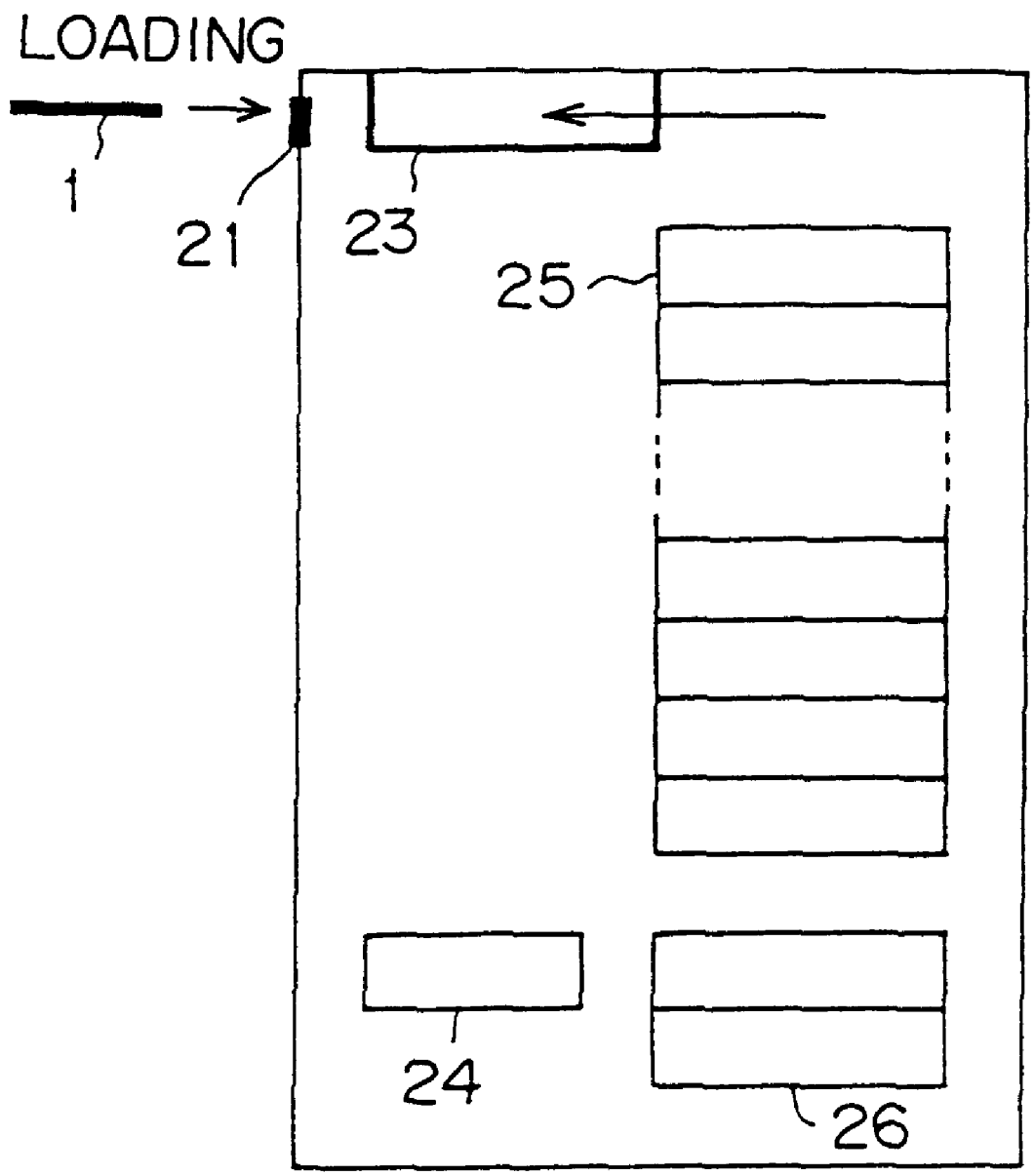
FIG. 4 shows a second sectional view.
Figure 5:
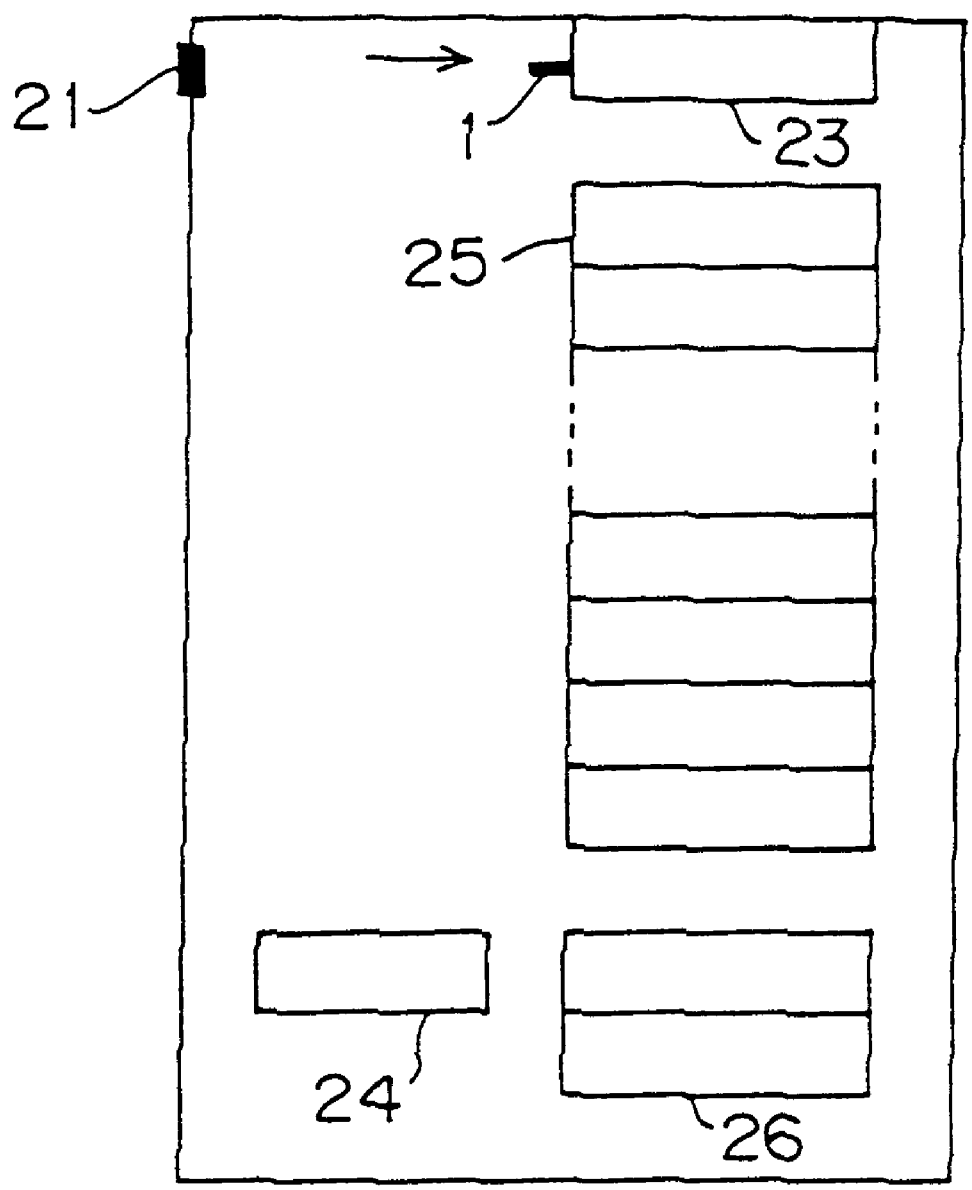
FIG. 5 shows a third sectional view.

Assume that a user sets a switch on the operator panel 22 to "LOAD" when the library device is in a state as shown in FIG. 3, and turns on the power. The library device enters the mass loading mode at this time, and the CAS 23 moves to the loading/unloading aperture 21 as shown in FIG. 4. When the user loads a cartridge 1, the CAS 23 moves backward, as shown in FIG. 5.

Figure 6:
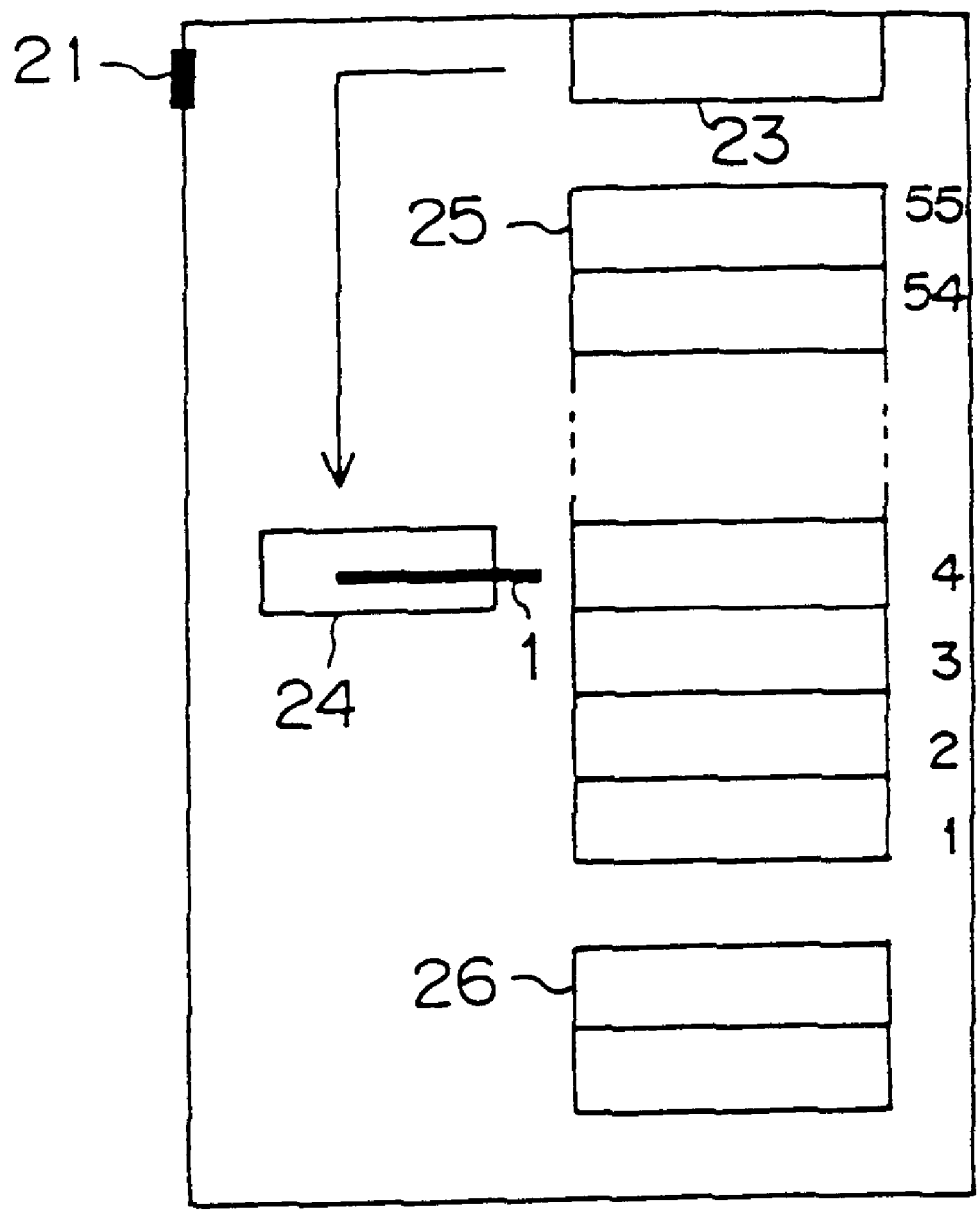
FIG. 6 shows a fourth sectional view.
Figure 7:
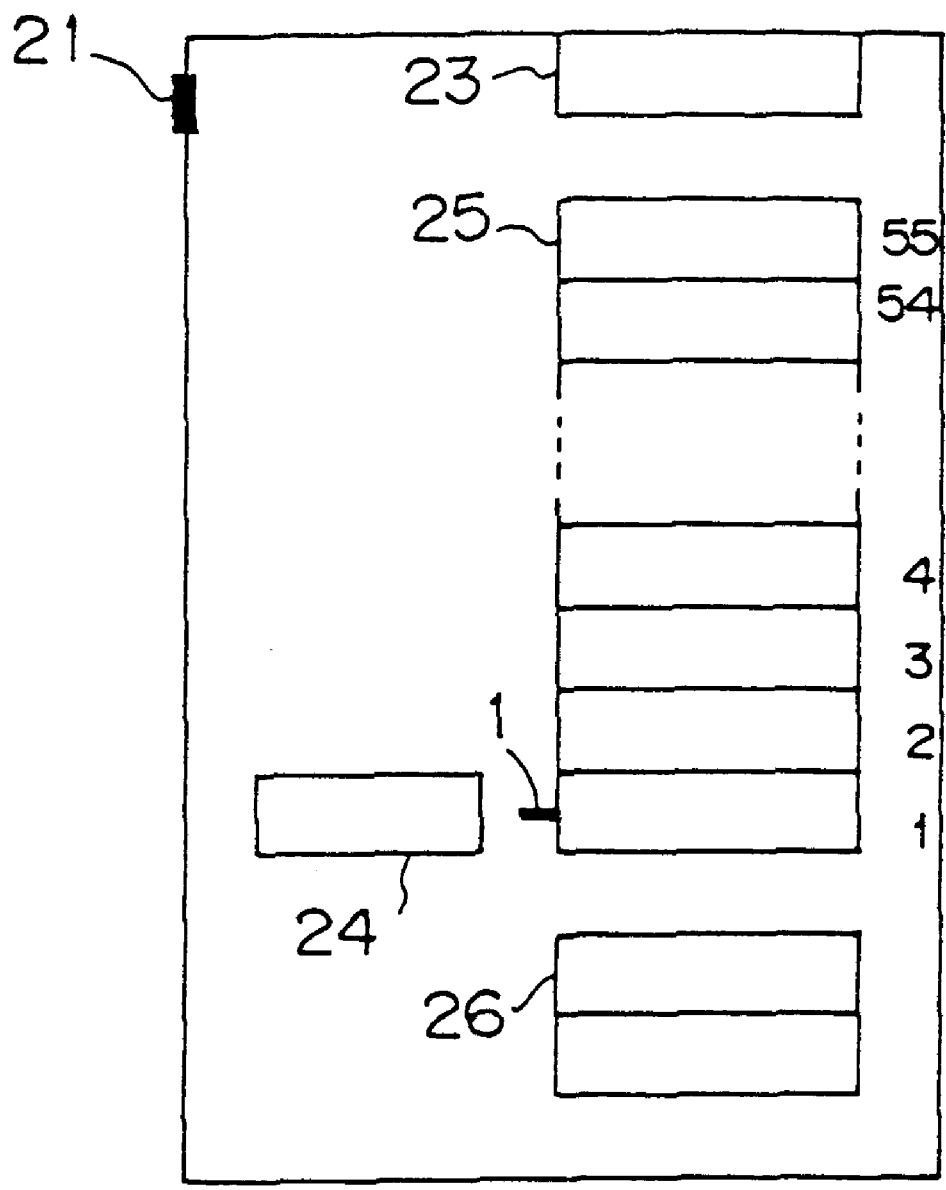
FIG. 7 shows a fifth sectional view.

Then, the mechanical hand 24 moves upward, takes out the cartridge 1 from the CAS 23, and carries the cartridge 1 to an empty slot having the smallest number among the slots 25 (No. 1 through No. 55), as shown in FIG. 6. If the slot numbered 1 is empty, the mechanical hand 24 inserts the cartridge 1 into that slot, as shown in FIG. 7.

Figure 8:
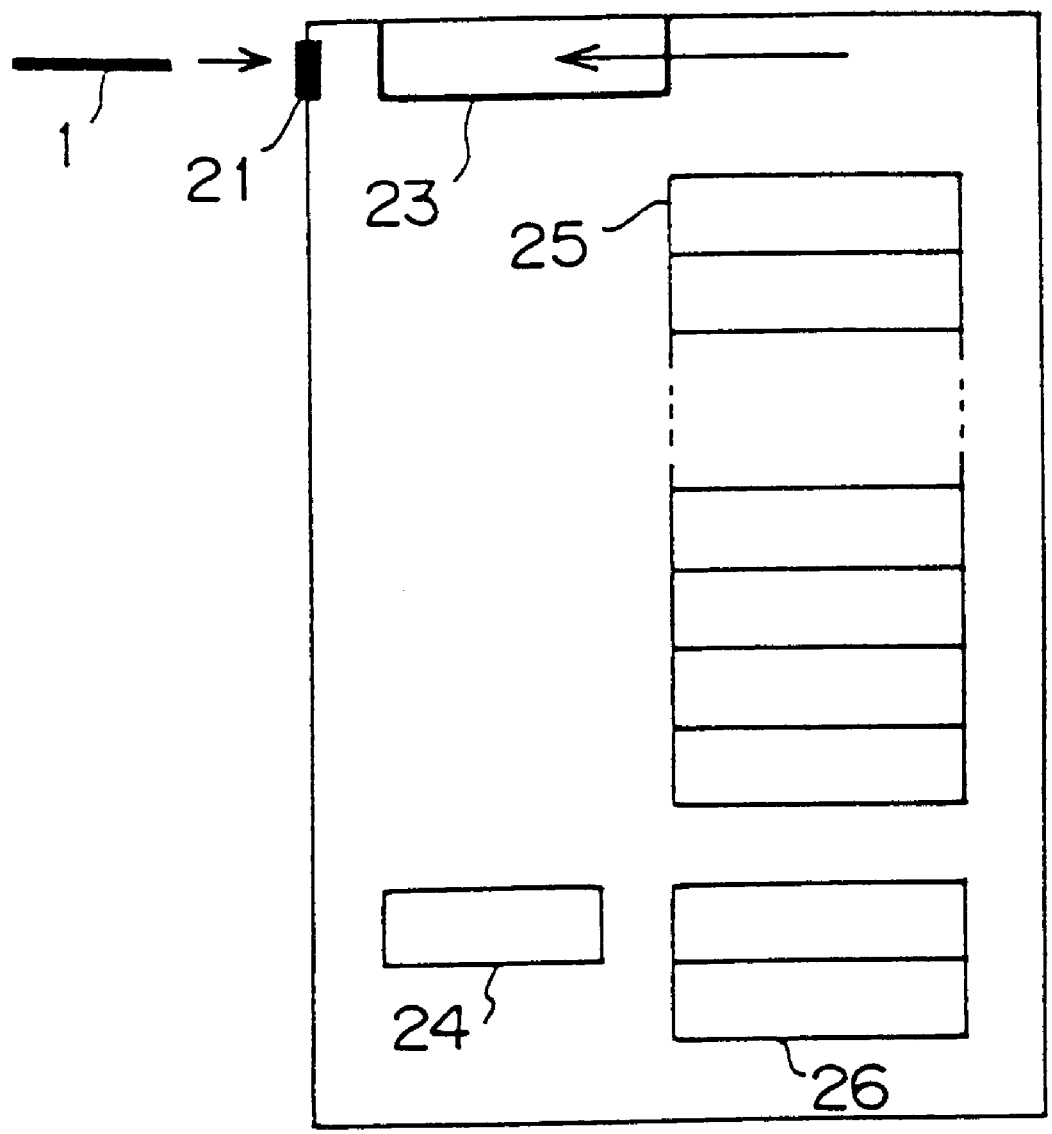
FIG. 8 shows a sixth sectional view.

Next, the mechanical hand 24 returns to the original position, and the CAS 23 moves to the loading/unloading aperture 21 to receive the next cartridge 1, as shown in FIG. 8. Then, the library device automatically repeats the operations shown in FIGS. 4 through 8, and loads a plurality of cartridges 1 into the slots 25. If the slots 25 become full, or if the user completes the loading operation of the plurality of cartridges 1, the device terminates its operations.

By providing such a mass loading mode, a number of cartridges 1 can be loaded using the CAS 23. Furthermore, it is sufficient for a user to perform a switch operation only once. This means that the user need not operate the operator panel 22, etc. each time he or she loads a cartridge 1.

Similarly, if the user sets the switch on the operator panel 22 to "UNLOAD", and turns on the power when the library device is in a state as shown in FIG. 3, when he or she wants to unload the cartridges 1, the library device enters the mass unloading mode. In this mode, the library device repeats the operation of carrying a cartridge 1 from one of the slots 25 to the loading/unloading aperture 21, the reverse of the operations shown in FIGS. 4 through 8. By providing such a mass unloading mode, a number of cartridges 1 can be unloaded using the CAS 23.

Provided next is the explanation about the structure of a control system of the library device, by referring to FIGS. 9 through 14.

FIG. 9 is a block diagram showing the structure of the control system of the library device. In the control system 31 shown in FIG. 9, a MAIN board 32 is equipped with an internal DIP switch (DIP SW) 33, and is connected with the operator panel 22, alarm board 37, AC power supply unit 39, optical disk drives (ODDs) 40 and 41, hand controlling unit (HAND) 42, and a Y-axis motor (Y motor) 43.

The DIP switch 33 is used to control peripheral circuitry. The operator panel 22 is equipped with a DIP switch 35 for switching modes, and is connected with a CAS board 36 for controlling the CAS 23. The user sets the mass loading mode or mass unloading mode by operating the DIP switch 35. The MAIN board 32 transmits control signals to the CAS board 36 and the hand controlling unit 42 according to the set mode.

The hand controlling unit 42 controls motors for operating an arm and fingers of the mechanical hand 24, and senses the operation of a Y motor 43 for driving the mechanical hand 24 upward and downward. A cooling fan (FAN) 38 is connected to the alarm board 37.

A connector 34 of the MAIN board 32, the ODDs 40 and 41, and a connector 45 (SCSI OUT) to which a terminating resistor is attached, are connected to a SCSI (Small Computer System Interface) of a host computer 46, via a connector 44 (SCSI IN). The SCSI interface allows the host computer 46 to transmit a command, etc. to the MAIN board 32.

Figure 10:
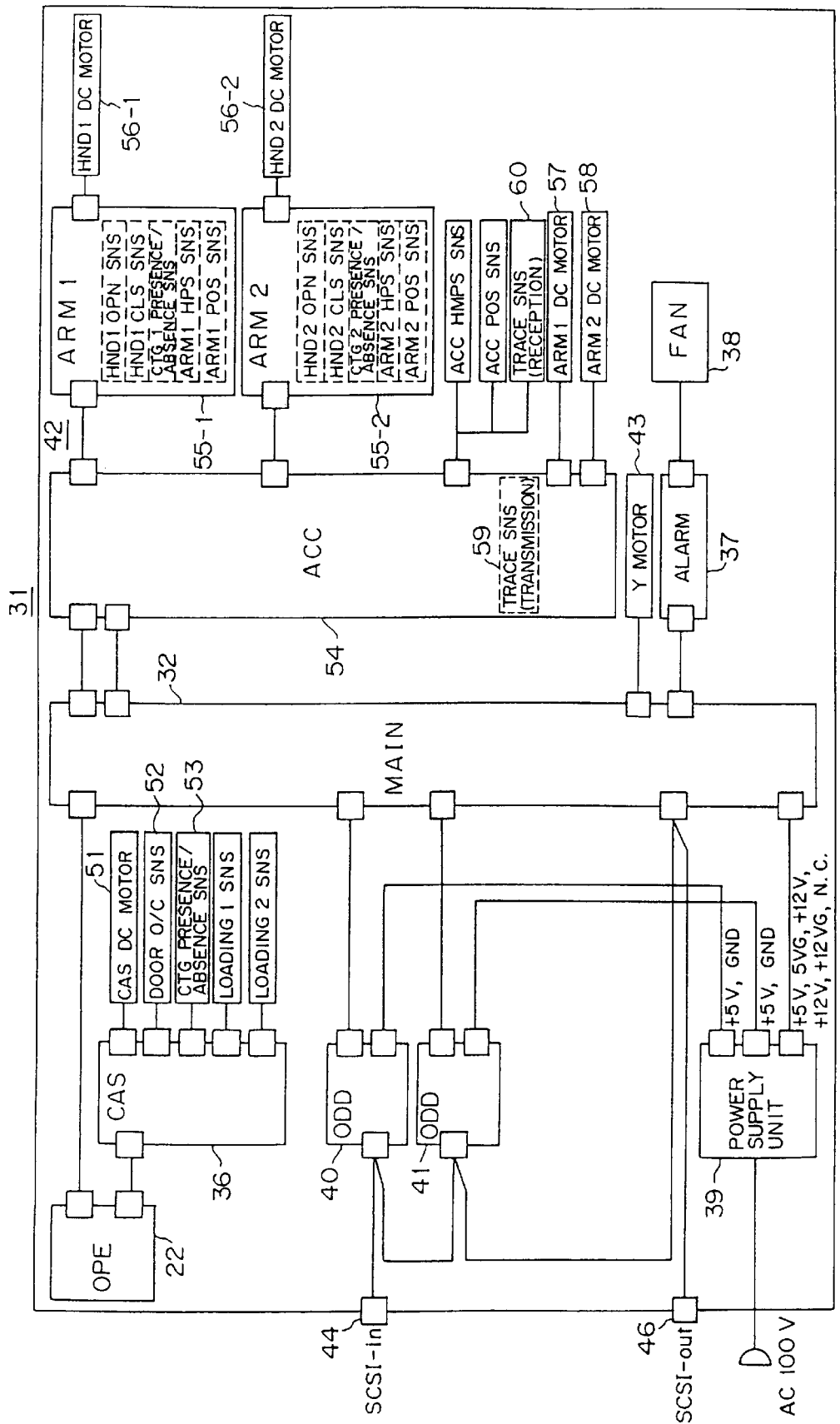
FIG. 10 is a block diagram showing the details of the library device.

FIG. 10 shows the details of the control system 31 shown in FIG. 9. In FIG. 10, the AC power supply unit 39 generates two voltages such as DC 5 V and DC 12 V from AC 100 V, and distributes them to the ODDs 40 and 41, and the MAIN board 32.

The CAS board 36 drives a CAS motor 51 based on a control signal from the operator panel 22, and transmits signals from sensors 52 and 53 to the operator panel 22. The sensor 52 senses the opening/closing of the loading/unloading aperture 21, while the sensor 53 senses whether or not a cartridge 1 is present in the CAS 23.

The hand controlling unit 42 comprises an ACC board 54, and ARM units 55-1 and 55-2, which control motors 56-1 and 56-2 for driving the fingers of the mechanical hand 24. The ACC board 54 controls motors 57 and 58 for driving the arm of the mechanical hand 24, and senses the operation of the Y motor 43 using trace sensors 59 and 60. A signal from the trace sensor 60 is also transmitted to the MAIN board 32 via the ACC board 54.

Figure 11:
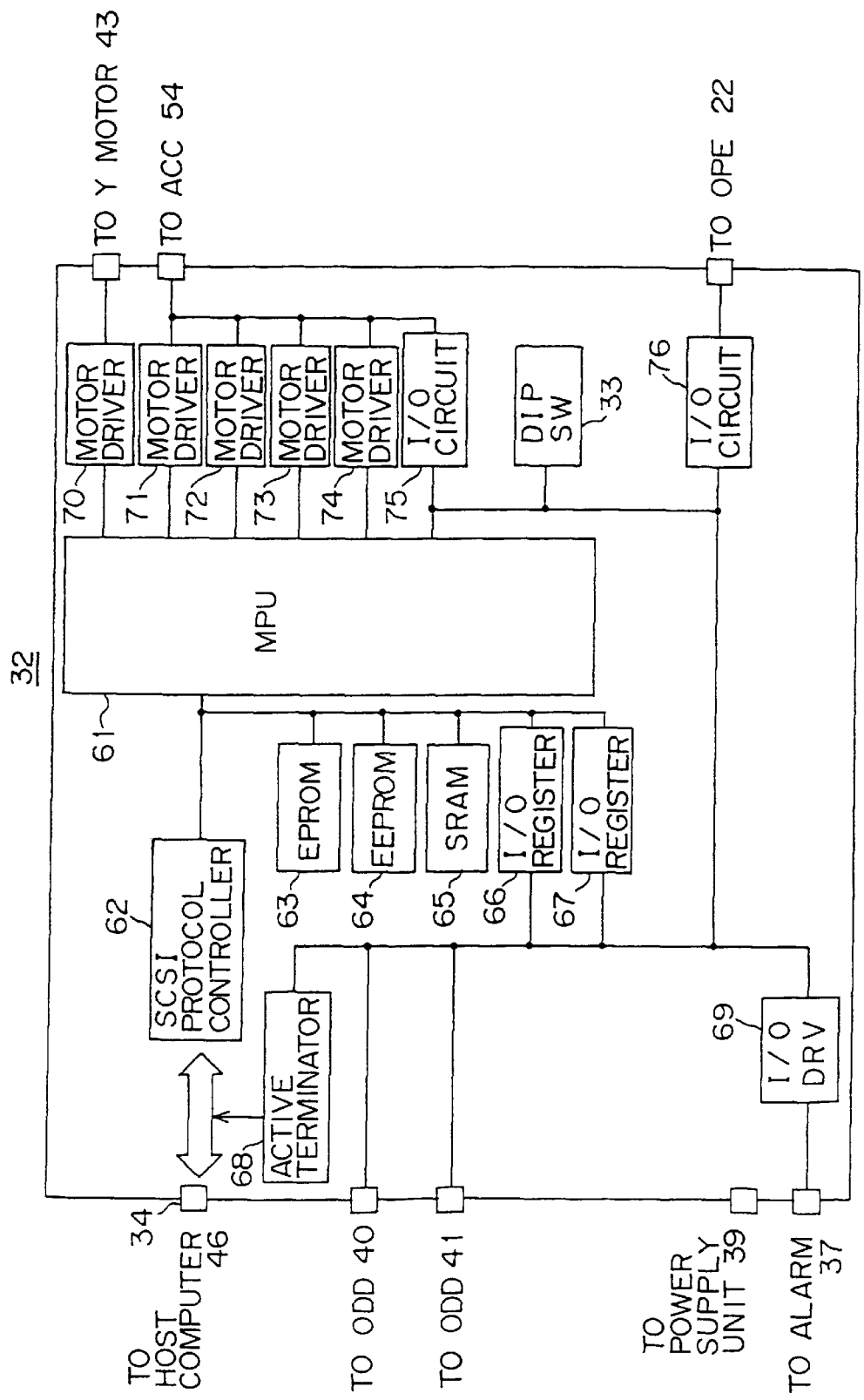
FIG. 11 is a block diagram showing the structure of a MAIN board.

FIG. 11 shows the structure of the MAIN board 32. In this figure, an MPU 61 is connected with a SCSI protocol controller 62, EPROM (Erasable and Programmable Read Only Memory) 63, EEPROM (Electrically Erasable and Programmable Read Only Memory) 64, SRM (Static Random Access Memory) 65, I/O registers 66 and 67, active terminator 68, I/O driver 69, motor drivers 70 through 74, I/O circuits 75 and 76, and a DIP switch 33.

The MPU 61 processes data using the SRAM 65 according to programs and data stored in the EPROM 63 and EEPROM 64, and controls peripheral circuits. The SCSI protocol controller 62 and active terminator 68 control communications with the host computer 46. The I/O registers 66 and 67 are used to exchange data between the peripheral circuits and the MPU 61.

The I/O driver 69 drives the motor of the cooling fan 38 via the alarm board 37. The motor driver 70 drives the Y motor 43, and the motor drivers 71, 72, 73, and 74 respectively drive the motors 56-1, 56-2, 57, and 58. The I/O circuit 75 controls signals between the ACC board 54 and the MPU 61, while the I/O circuit 76 controls signals between the operator panel 22 and the MPU 61.

Figure 12:
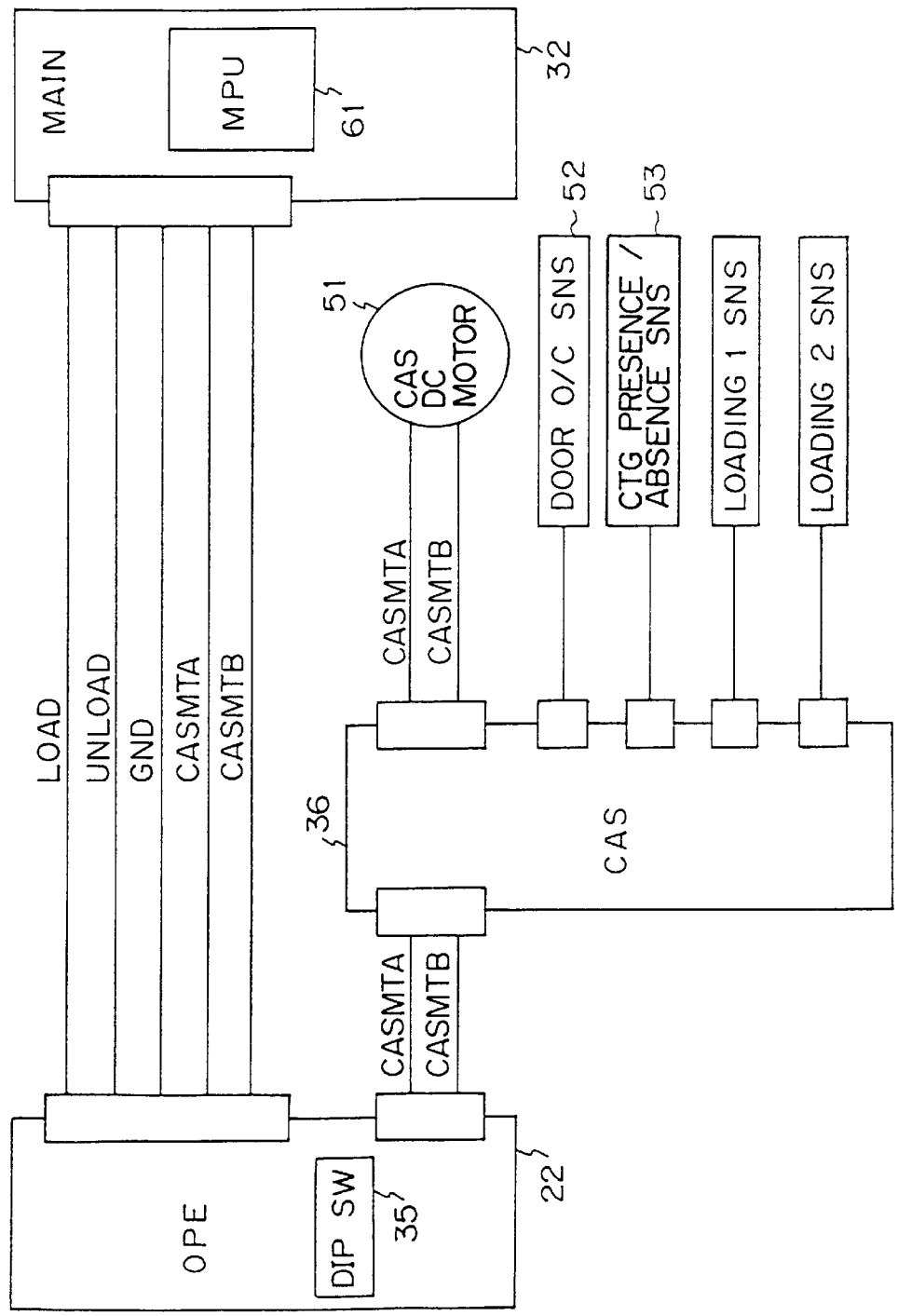
FIG. 12 is a block diagram showing control signals.

FIG. 12 shows some of the control signals exchanged between the MAIN board 32, operator panel 22, and the CAS board 36. When a user specifies a mode using the DIP switch 35, and turns on the power, the specified mode is notified to the MAIN board 32 via signal lines LOAD and UNLOAD.

If the mass loading mode is specified, the logic of the signal LOAD becomes "1", and the logic of the signal UNLOAD becomes "0". If the mass unloading mode is specified, the logic of the signal LOAD becomes "0", while the logic of the signal UNLOAD becomes "1". In other cases, logic of both of the signals LOAD and UNLOAD becomes "0".

The MPU 61 recognizes an operating mode according to the states of these signals. It executes a LOAD routine in the mass loading mode, and executes an UNLOAD routine in the mass unloading mode. The MPU 61 supplies power to the CAS motor 51 via lines CASMTA and CASMTB. Then, the CAS 23 performs mass loading/unloading operations.

Figure 13:
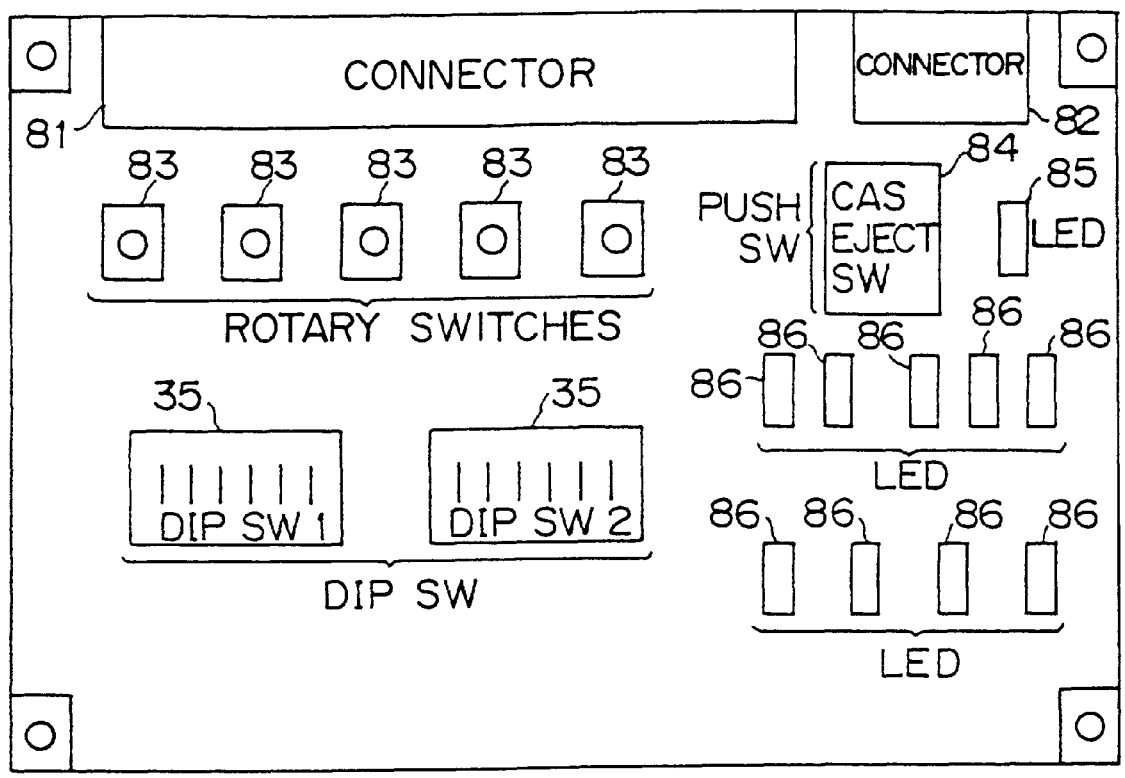
FIG. 13 is a schematic diagram showing the structure of an operator panel.

FIG. 13 shows the layout of the operator panel 22. On the operator panel 22 shown in FIG. 13, a connector 81 is connected via a cable with the MAIN board 32, and a connector 82 is connected to the CAS board 36. Rotary switches 83 are used to assign SCSI IDs to the MAIN board 32, and the ODDs 40 and 41. The CAS eject switch 84 is used to enable an access to the CAS 23 by opening the loading/unloading aperture 21.

When the CAS eject switch 84 is turned on, the library device does not open the loading/unloading aperture 21 and lights up a green CAS LED (Light Emitting Diode) 85 if the CAS 23 is not positioned adjacent to the loading/unloading aperture 21. When the CAS 23 moves adjacent to the loading/unloading aperture 21, the library device opens the loading/unloading aperture 21, and puts out the CAS LED 85.

The DIP switches 35 are used so that a user externally sets the specification/state of the library device. Although the definition using the DIP switches 35 varies depending on a specification, they are determined, for example, as shown in FIG. 14. In FIG. 14, the switch (1) of the DIP switch 35 is used to turn on/off the terminating resistor of the connector 45. The switches (2), (3), (4), (7), and (8) are used to set the MAIN board 32, and the switches (5), (6), (9), (10), and (11) are used to set the ODDs 40 and 41.

The LOAD switch (3) is used to set the mass loading mode. If it is turned on, the library device enters the mass loading (cartridge loading) mode. If it is turned off, the device enters the normal operation mode. In the meantime, an UNLOAD switch (4) is used to set the mass unloading mode. If it is turned on, the device enters the mass unloading (cartridge unloading) mode. If it is turned off, the device enters the normal operation mode.

LEDs 86 shown in FIG. 13 are arranged to notify a user of the state of the library device. They include, for example, a POWER LED (green), ONLINE LED (green), CHECK LED (orange), ALARM LED (orange), ARC LED (green), ODD LED (green), etc.

The POWER LED lights up if power is turned on, and goes out if power is turned off. The ONLINE LED lights up in an online state, and goes out in an offline state. The CHECK LED lights up when a fault occurs, and goes out in a normal state. The ALARM LED lights up in order to give a FAN alarm/temperature alarm, and goes out in a normal state. The ARC LED lights up while the accessor is operating, and goes out when it is not operating. The ODD LED lights up while the ODDs 40 and 41 are operating, and goes out when they are not operating.

The library device makes any of the LEDs 86 light up or blink during the loading/unloading operations in the mass loading/unloading mode, and puts them out at the termination of the operations. Therefore, a user can perform the loading/unloading operations of the cartridge 1 while verifying an operation mode. Otherwise, the operation mode, etc., may be displayed by arranging a liquid crystal display on the operator panel 22.

Figure 15:
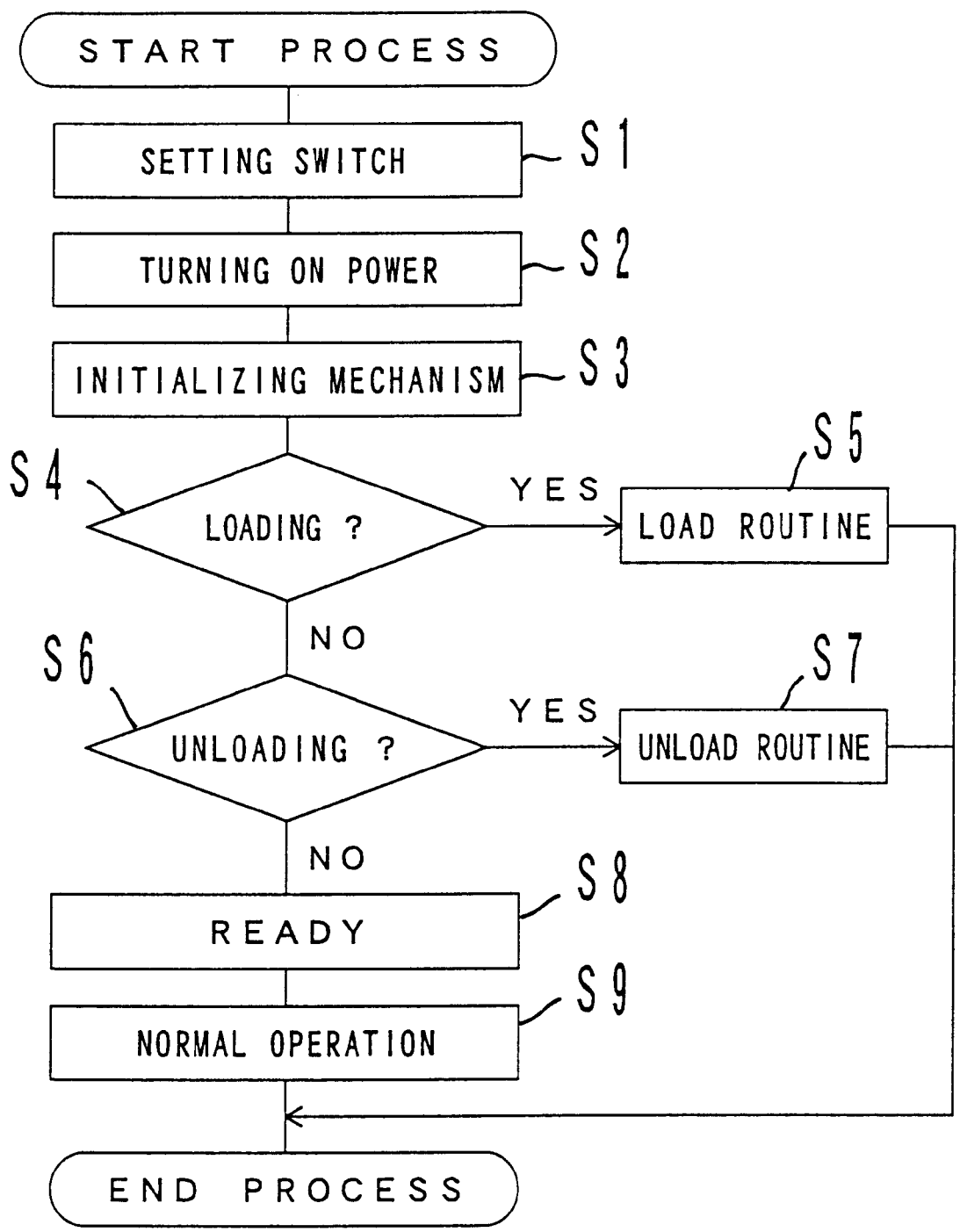
FIG. 15 is a flowchart showing a loading/unloading process.
Figure 16:
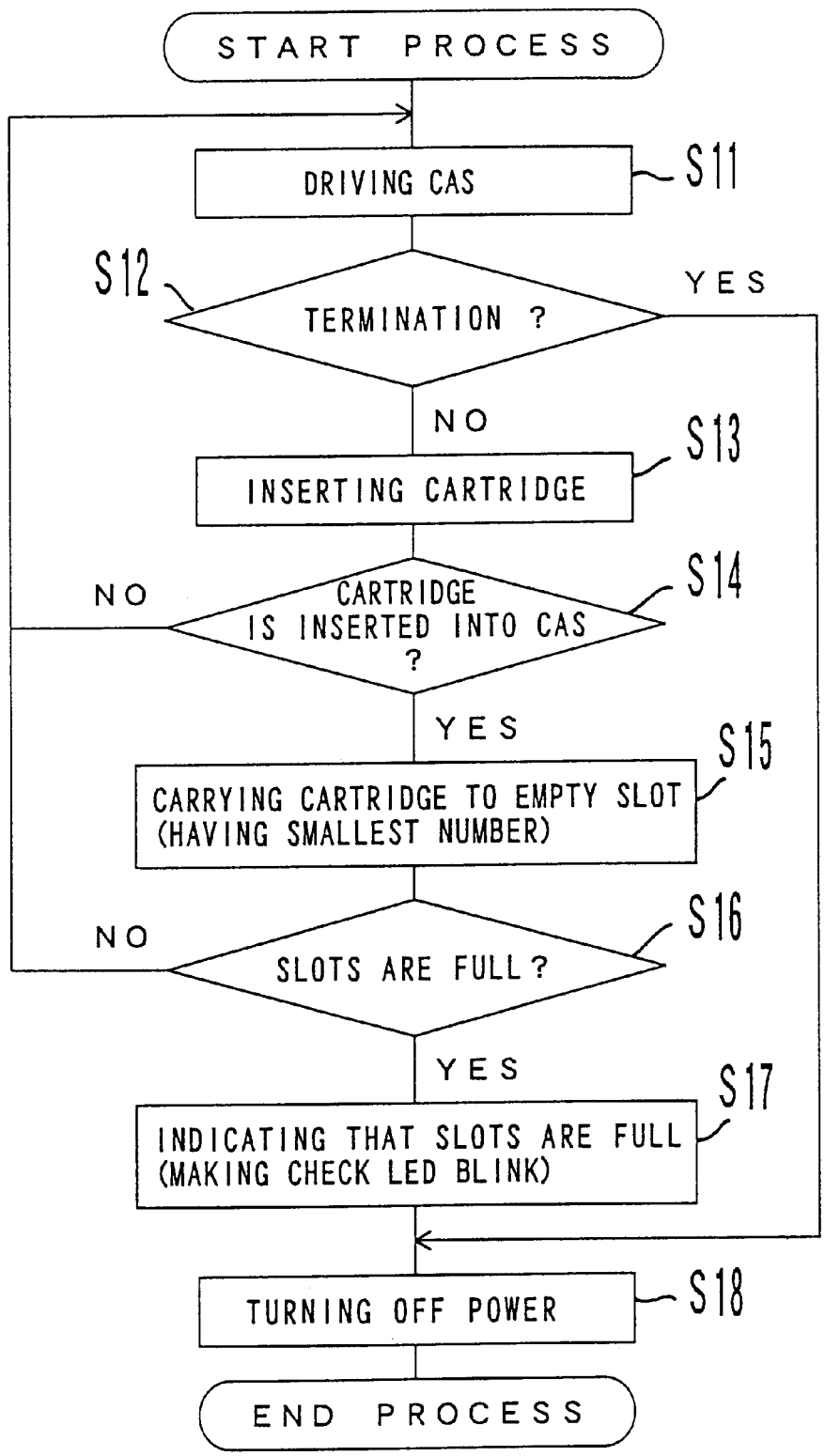
FIG. 16 is a flowchart showing a first LOAD routine.
Figure 17:
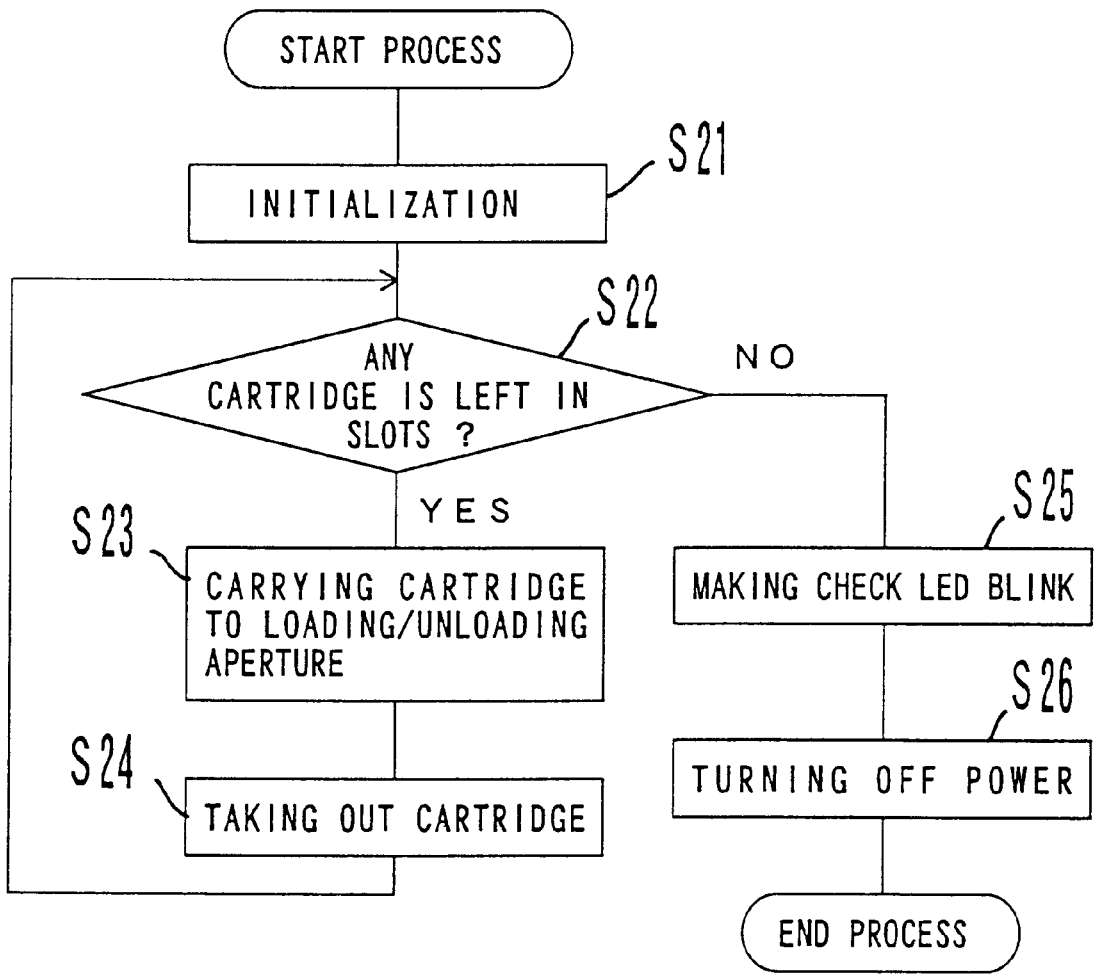
FIG. 17 is a flowchart showing a first UNLOAD routine.

Provided next are the explanations about the process routines performed by the MPU 61, by referring to FIGS. 15 through 17.

FIG. 15 is a flowchart showing the process for loading/unloading cartridges, which is controlled by the MPU 61. When a user sets the DIP switch 35 (step S1) and turns on the power (step S2), the MPU 61 initializes each mechanism (step S3), and determines whether the LOAD switch is either ON or OFF (step S4).

ON/OFF of the LOAD switch is determined according to the value of the control signal LOAD shown in FIG. 12. If the LOAD switch is ON, a LOAD routine shown in FIG. 16 is executed (step S5), and the process is terminated.

If the LOAD switch is OFF, it is then determined whether the UNLOAD switch is either ON or OFF (step S6). ON/OFF of the UNLOAD switch is determined according to the value of the control signal UNLOAD shown in FIG. 12. If the UNLOAD switch is ON, an UNLOAD routine shown in FIG. 17 is executed (step S7), and the process is terminated. If the UNLOAD switch is OFF, the MPU 61 will be in a READY state (step S8), controls normal operations (step S9), and terminates the process.

In the LOAD routine shown in FIG. 16, the MPU 61 moves the CAS 23 adjacent to the loading/unloading aperture 21, opens the loading/unloading aperture 21, thereby enabling an access to the CAS 23 (step S11). Here, a user determines whether or not to terminate the loading of cartridges 1 (step S12,). When the user turns off the power (step S18), the LOAD routine is terminated.

If the user continues to load cartridges, he or she inserts a cartridge 1 into the loading/unloading aperture 21 (step S13). The MPU 61 determines whether or not the cartridge 1 is inserted into the CAS 23 (step S14). If "YES", the MPU 61 drives the CAS 23 and the mechanical hand 24, and carries the cartridge 1 to the slot 25 having the smallest number (step S15).

Then, the MPU 61 determines whether or not the slots 25 are full (step S16). If "YES", the MPU 61 makes the CHECK LED blink (step S17), and notifies the user that the next cartridge 1 cannot be accepted. Here, the user turns off the power (step S18), and the LOAD routine is terminated.

If a cartridge 1 is not inserted in step S14, or if the slots 25 are not full in step S16, the MPU 61 automatically repeats the process in and after step S11. The operations for loading a mass of cartridges 1 using the CAS 23 are implemented by including such a LOAD routine into the MAIN board 32. It is sufficient for the user to sequentially insert cartridges 1 into the loading/unloading aperture 21, and no additional operations are required. Therefore, the operation efficiency can be improved.

In the UNLOAD routine shown in FIG. 17, the MPU 61 performs an initialization process (step S21), and determines whether a cartridge 1 is left in any of the slots 25 (step S22). If "YES", the MPU 61 drives the mechanical hand 24 and the CAS 23, thereby carrying the cartridge 1 to the loading/unloading aperture 21 (step S23).

When the user takes out the cartridge 1 (step S24), the MPU 61 automatically repeats the process in and after step S22.

If no cartridge 1 is left in the slot 25 in step S22, the MPU 61 makes the CHECK LED blink, and notifies the user that the unloading operation of the cartridges is completed (step S25). Then, the user turns off the power (step S26), and the UNLOAD routine is terminated.

The operations for unloading a mass of cartridges 1 using the CAS 23 are implemented by including such an UNLOAD routine into the MAIN board 32. It is sufficient for the user to sequentially take out cartridges 1 from the loading/unloading aperture 21, and no additional operations are required. Therefore, the operation efficiency can be improved.

Provided next is the explanation about the operations of the optical disk library device according to a second embodiment of the present invention by referring to FIGS. 18 through 26.

Figure 18:
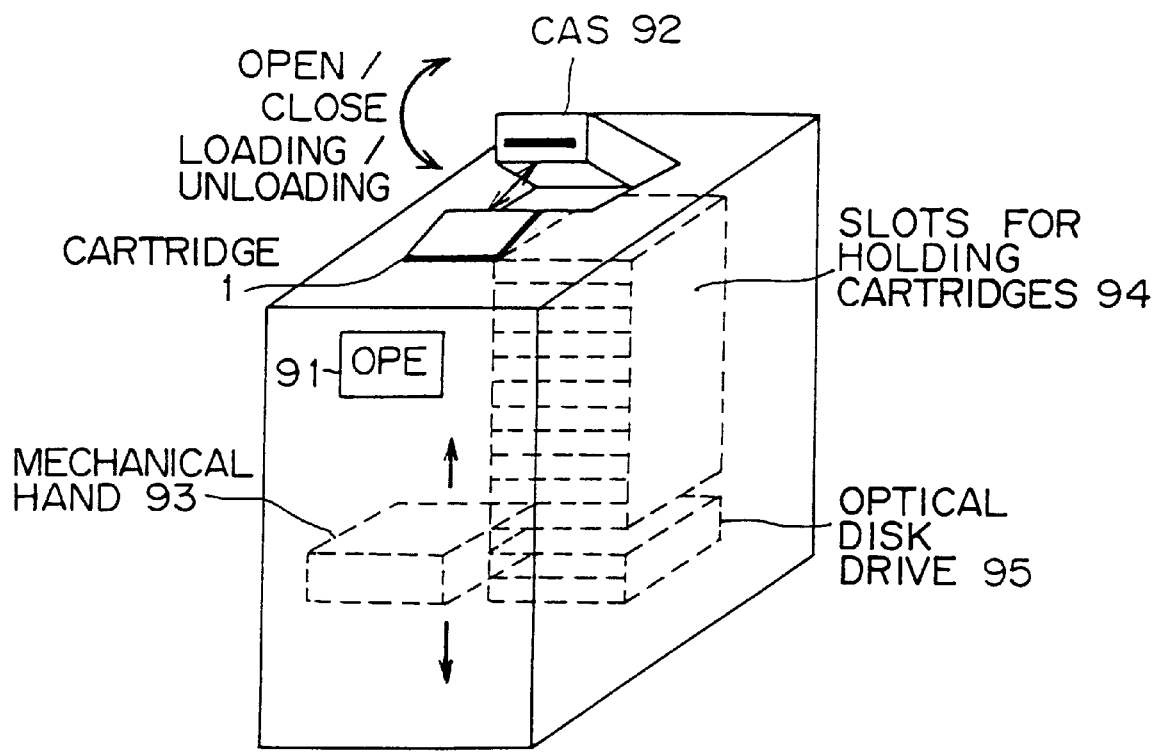
FIG. 18 is a schematic diagram showing a second optical disk library device.

FIG. 18 shows the optical disk library device according to the second embodiment. In this figure, an operator panel (OPE) 91 is arranged on the front of the optical disk library device, and a CAS 92 is arranged on the top of the device. Furthermore, a mechanical hand 93, slots for holding cartridges 94, and an optical disk drive 95 are built into the device.

The CAS 92 also serves as a loading/unloading aperture, and opens upward when a cartridge 1 is to be loaded/unloaded. The mechanical hand 93 moves upward and downward as part of an accessor, and carries the cartridge 1 between the CAS 92, slot 94, and the optical disk drive 95.

Figure 19:
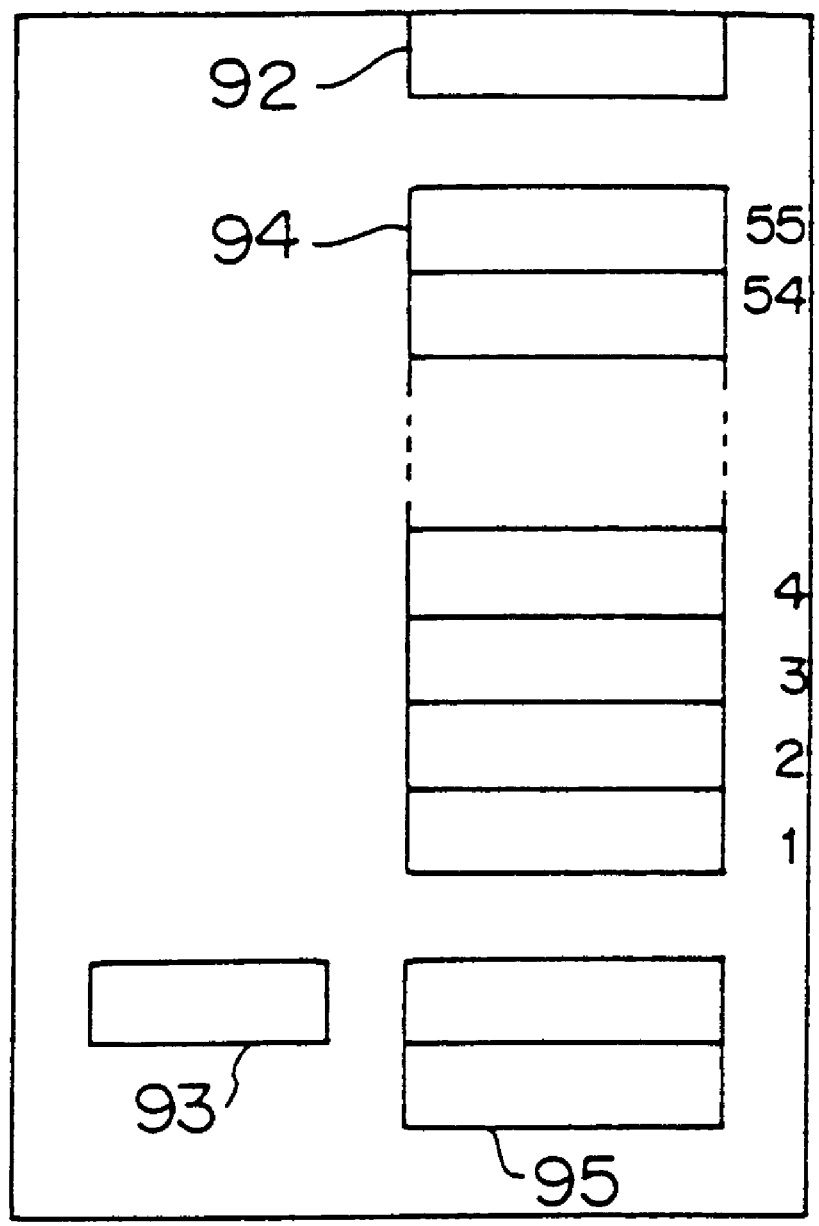
FIG. 19 shows a seventh sectional view.
Figure 21:
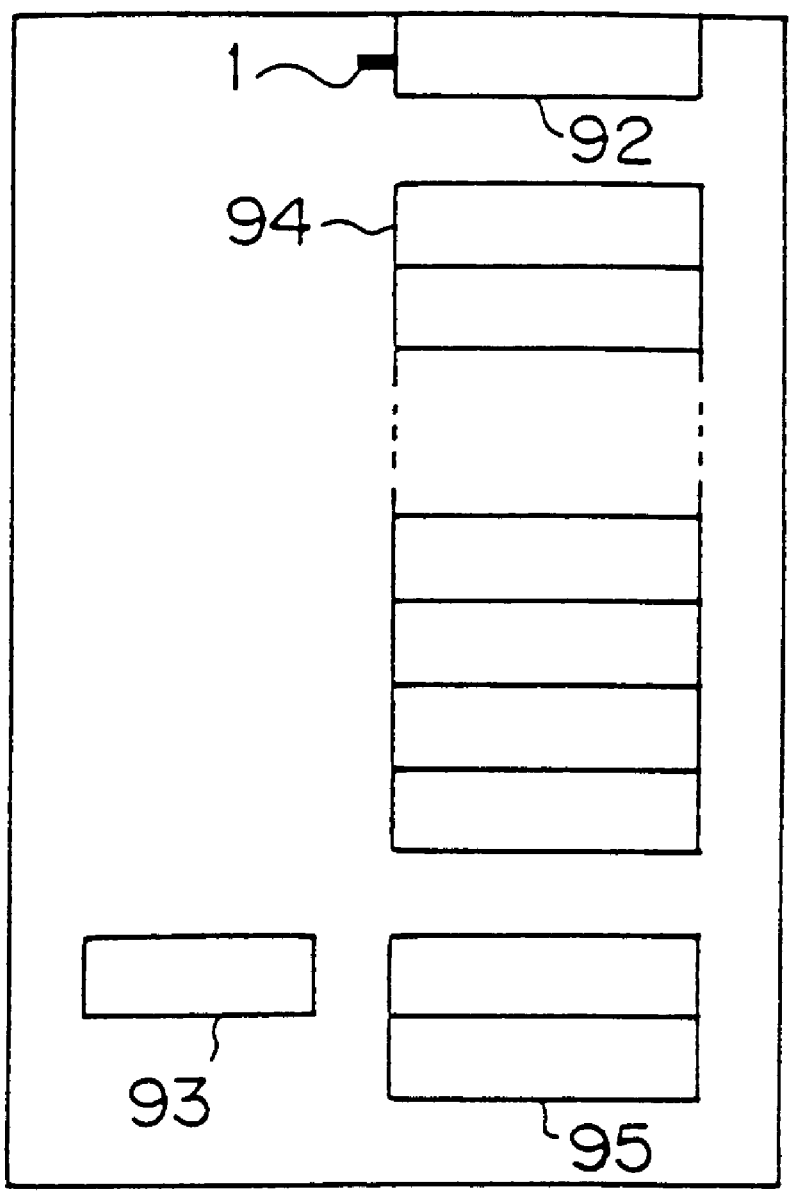
FIG. 21 shows a ninth sectional view.

Assume that a user sets the switch on the operator panel 91 to "LOAD" and turns on the power, when the library device is in the state shown in FIG. 19. At this time, the library device enters the mass loading mode, and opens the CAS 92 as shown in FIG. 20. When the user loads a cartridge 1 and closes the CAS 92, the device will be in the state shown in FIG. 21.

Figure 22:
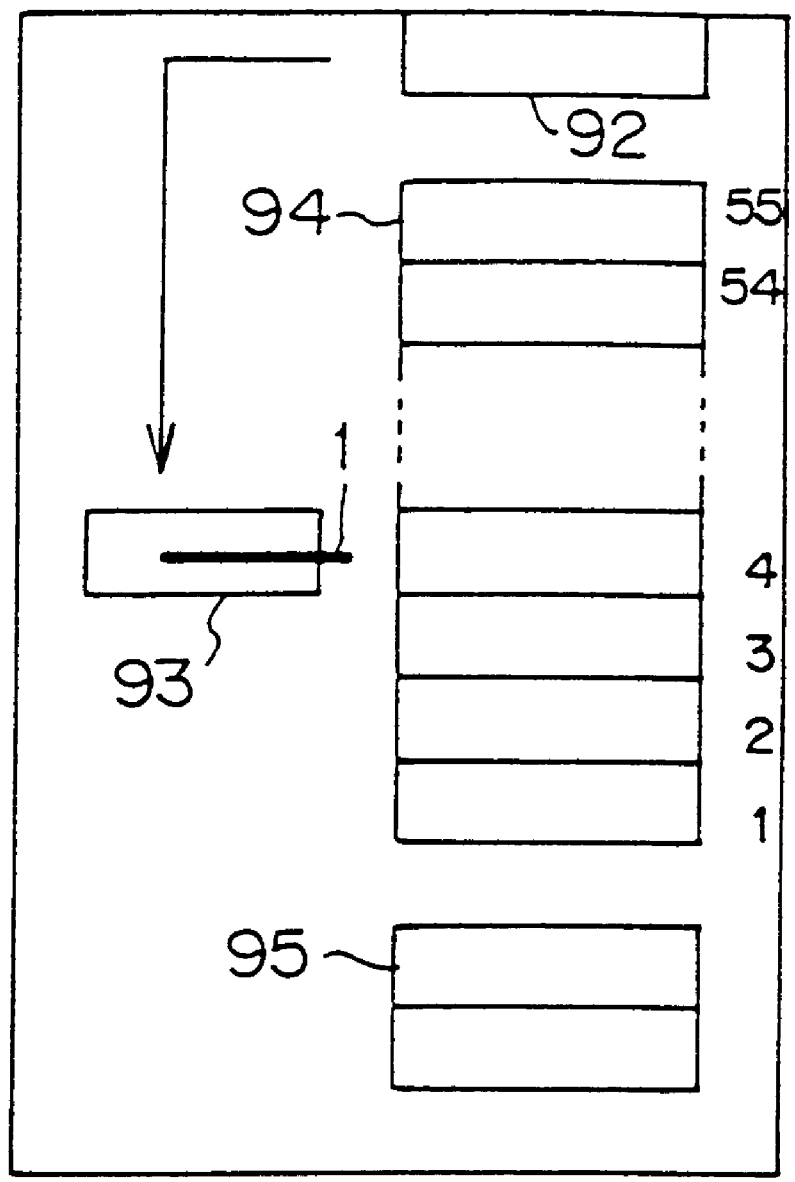
FIG. 22 shows a tenth sectional view.
Figure 23:
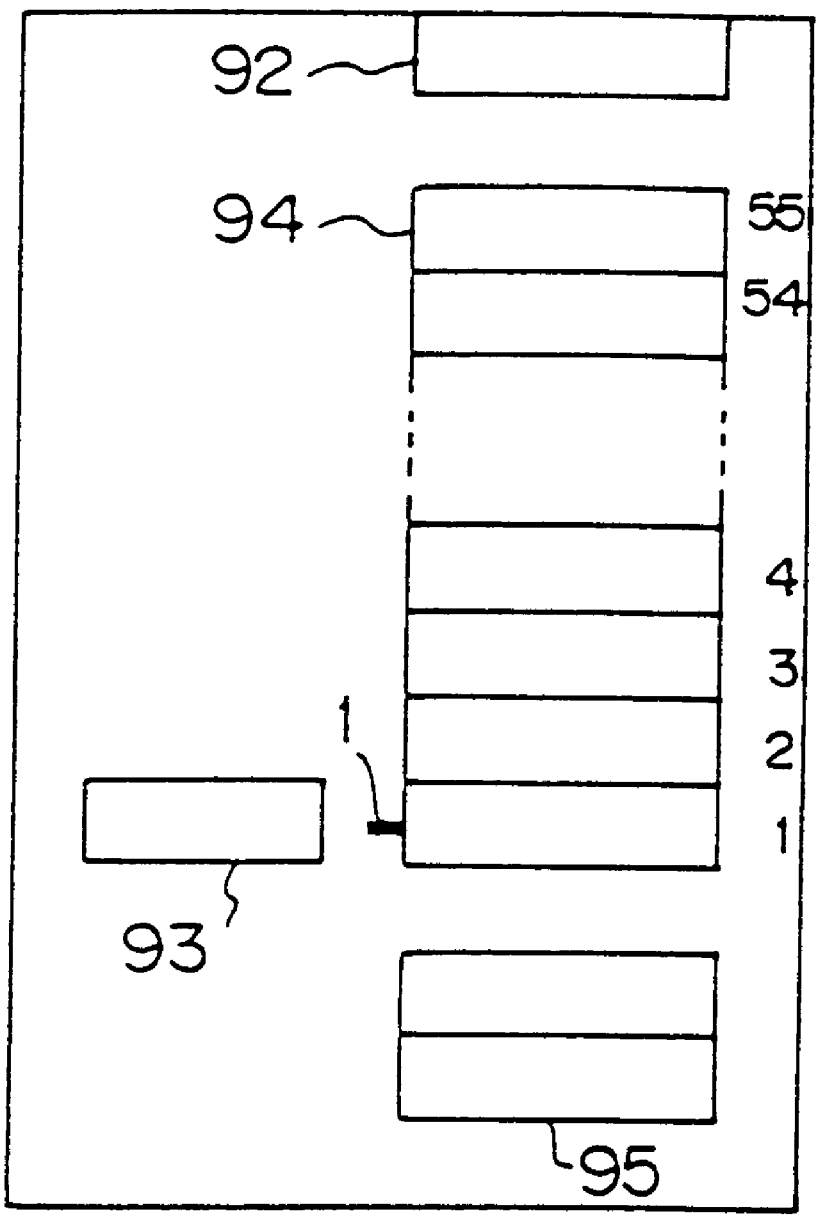
FIG. 23 shows an eleventh sectional view.

Next, the mechanical hand 93 moves upward, takes out the cartridge 1 from the CAS 92, carries it to an empty slot having the smallest number among slots 94 (No. 1 through No. 55), as shown in FIG. 22. Here, the mechanical hand 93 inserts the cartridge 1 into the slot numbered "1", as shown in FIG. 23.

Figure 24:
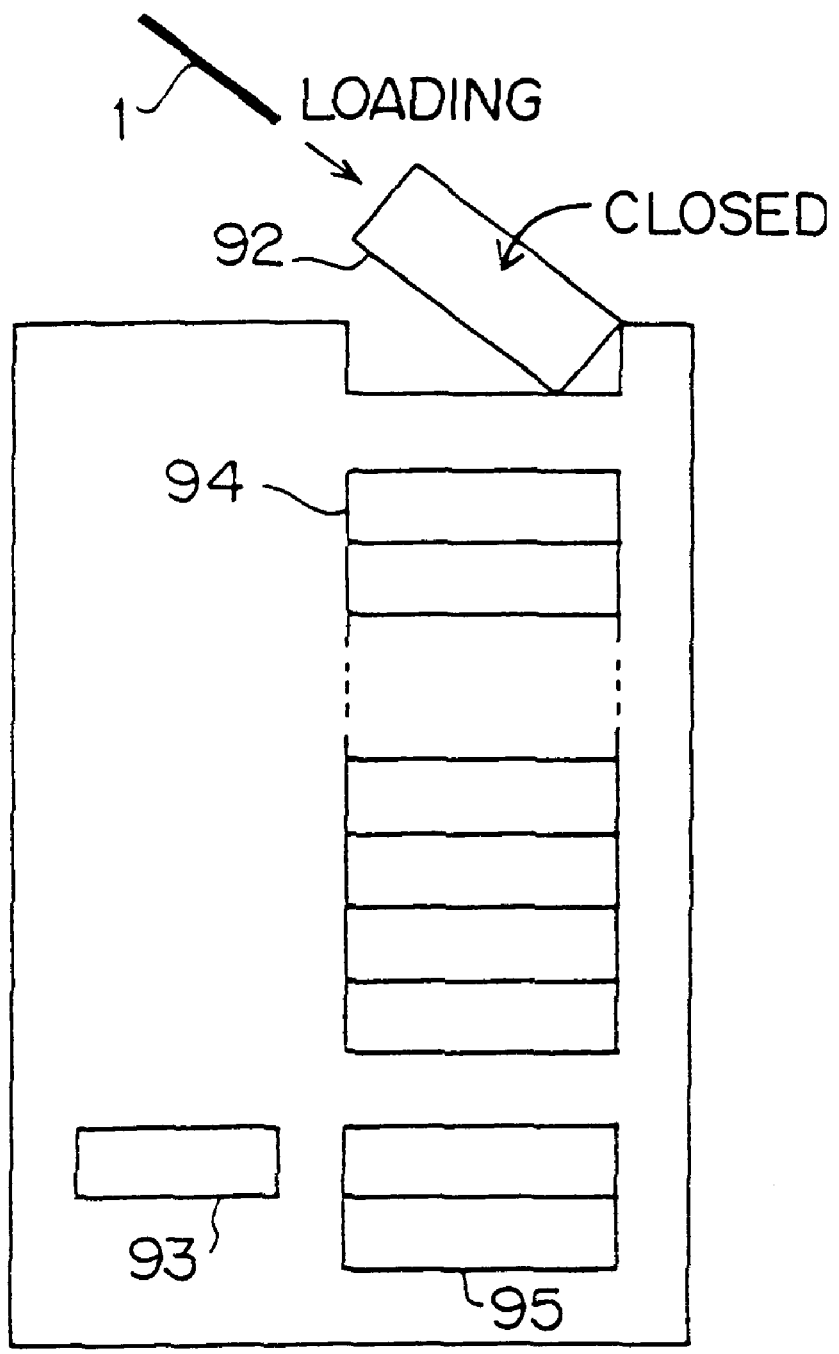
FIG. 24 shows a twelfth sectional view.

Then, the mechanical hand 93 returns to the original position, and the CAS 92 is opened to receive the next cartridge 1, as shown in FIG. 24. The library device automatically repeats the operations shown in FIGS. 21 through 24 thereafter, thereby loading a plurality of cartridges 1 into the slots 94. When the slots 94 become full, or when the user completes the loading of the plurality of cartridges 1, the library device completes its operations.

Similarly, the library device enters the mass unloading mode if the user sets the switch on the operator panel 91 to "UNLOAD", and turns on the power, when cartridges 1 are to be unloaded. In the mass unloading mode, the library device repeats the operations for carrying the cartridge 1 to the CAS 92, in reverse to the operations shown in FIGS. 20 through 24.

A number of cartridges 1 can be loaded/unloaded using the CAS 92, by arranging the mass loading/unloading mode in the second embodiment, in a similar manner as in the first embodiment. Further more, it is sufficient for a user to perform a switch operation only once, and he or she need not operate the operator panel 91, etc. each time he or she loads a cartridge 1.

The configuration and operations performed by the control system of the library device shown in FIG. 18 are similar to those performed by the control system 31 shown in FIG. 9. The operator panel 91 corresponds to the operator panel 22 shown in FIG. 9, and is equipped with the DIP switch 35. According to the second embodiment, the CAS motor 51 shown in FIG. 10 opens/closes the CAS 92, and the sensor 52 senses the opening/closing of the CAS 92. The CAS eject switch 84 shown in FIG. 13 is used to open the CAS 92.

Figure 25:
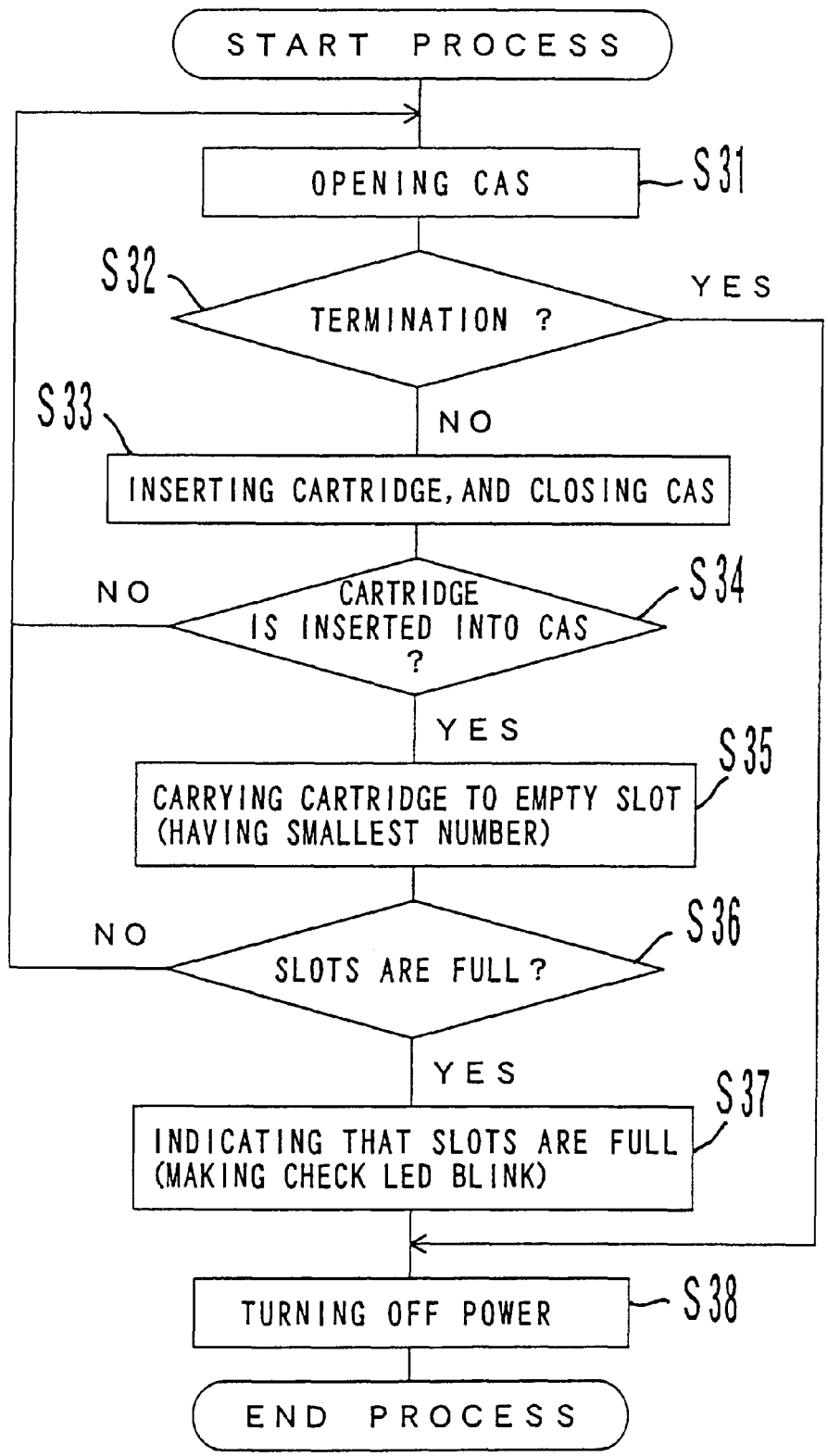
FIG. 25 is a flowchart showing a second LOAD routine.

FIG. 25 is a flowchart showing the LOAD routine according to the second embodiment. In the LOAD routine, the MPU 61 first opens the CAS 92, and enables an access to the CAS 92 (step S31). Here, the user determines whether or not to terminate the loading of a cartridge 1 (step S32). When the user turns off the power (step S38), the LOAD routine is terminated.

If the user continues to load the cartridges 1, he or she inserts a cartridge 1 into the CAS 92 and closes the CAS 92 (step S33). The MPU 61 determines whether or not the cartridge 1 is inserted into the CAS 92 (step S34). If "YES", the MPU 61 drives the mechanical hand 93, and carries the cartridge 1 to an empty slot 94 having the smallest number (step S35).

The MPU 61 then determines whether or not the slots 94 are full (step S36). If "YES", the MPU 61 makes the CHECK LED blink (step S37), and notifies the user that a next cartridge 1 cannot be accepted. Then, the user turns off the power (step S38), and the LOAD routine is terminated.

If a cartridge 1 is not inserted in step S34, or if the slots 94 are not full in step S36, the process in and after step S31 is automatically repeated.

The operations for loading a mass of cartridges 1 using the CAS 92 are implemented by including such a LOAD routine into the MAIN board 32. It is sufficient for the user to sequentially insert cartridges 1 into the CAS 92, and no additional operations are required. As a result, the operation efficiency can be improved.

Figure 26:
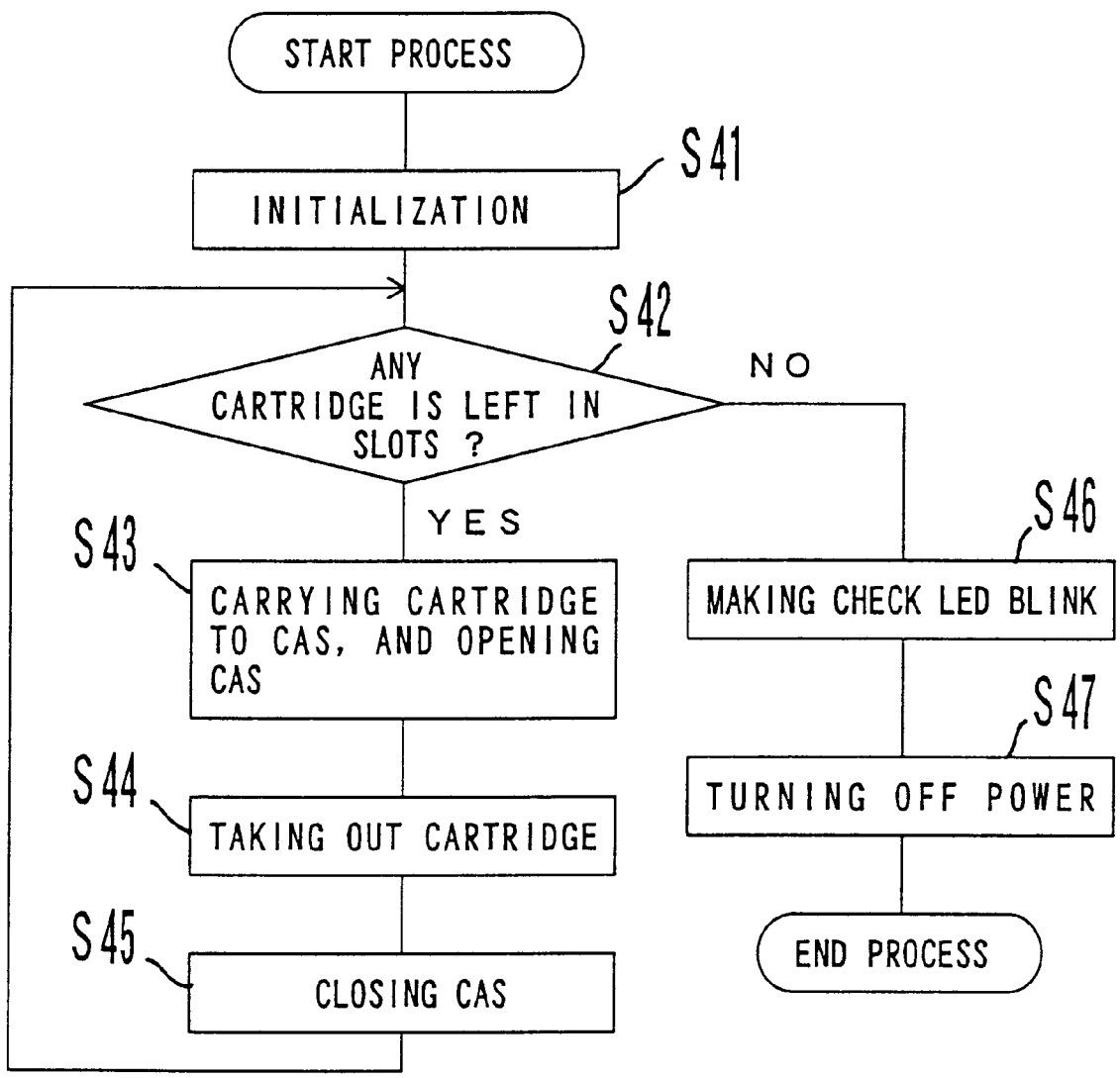
FIG. 26 is a flowchart showing a second UNLOAD routine.

FIG. 26 is a flowchart showing the UNLOAD routine according to the second embodiment. In the UNLOAD routine, the MPU 61 performs an initialization process (step S41), and determines whether or not any cartridge 1 is left in the slots 94 (step S42).

If "YES", the MPU 61 drives the mechanical hand 93, carries the cartridge 1 to the CAS 92, and opens the CAS 92 (step S43). When the user takes out the cartridge 1 (step S44) and closes the CAS 92 (step S45), the MPU 61 automatically repeats the process in and after S42.

If no cartridge 1 is left in the slots in step S42, the MPU 61 makes the CHECK LED blink, and notifies the user that the unloading operation of the cartridges 1 is completed (step S45). Then, the user turns off the power (step S47), and the UNLOAD routine is terminated.

The operations for unloading a mass of cartridges 1 using the CAS 92 are implemented by including such an UNLOAD routine into the MAIN board 32. It is sufficient for the user to sequentially unload cartridges 1 from the CAS 92, and no additional operations are required. Accordingly, the operation efficiency can be improved.

However, it is possible for someone to easily steal a cartridge 1 from the device if he or she misuses such a mass unloading capability. One solution to this problem is that an OPEN/CLOSE prohibition instruction conforming to the SCSI convention is used to make the loading/unloading aperture 21 or the CAS 92 unopenable. However, this prohibition instruction is cancelled when the power is turned on. Therefore, it is not so effective.

Figure 27:
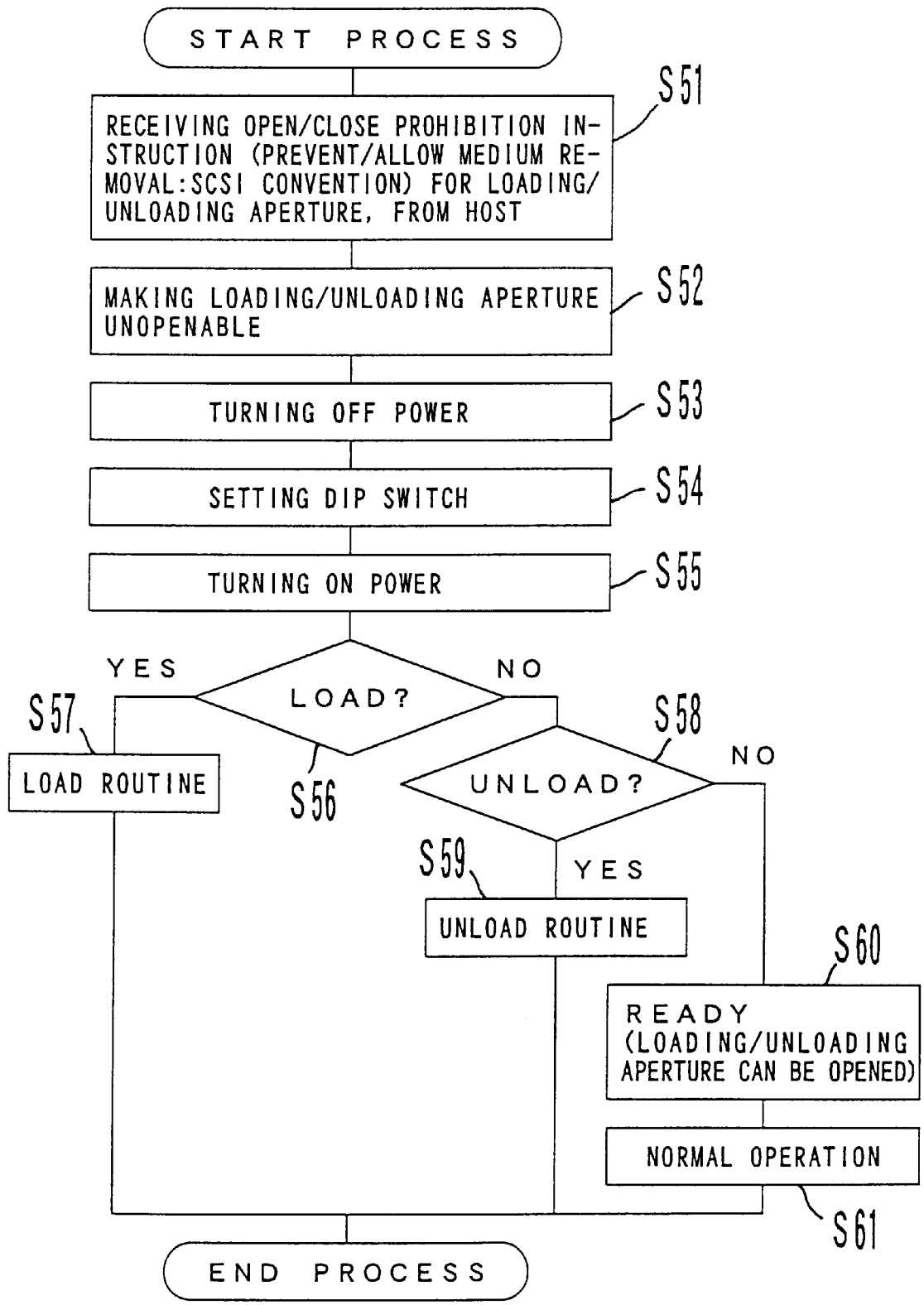
FIG. 27 is a flowchart showing a first OPEN/CLOSE prohibition process.

FIG. 27 is a flowchart showing such an OPEN/CLOSE prohibition process according to the first embodiment. A user first transmits the OPEN/CLOSE prohibition instruction conforming to the SCSI convention from the host computer 46 to the library device. When receiving the OPEN/CLOSE prohibition instruction (step S51), the MPU 61 included in the library device locks the CAS 23 to make the loading/unloading aperture 21 unopenable (step S52).

When the user turns off the power (step S53), sets the DIP switch 35 (step S54), and turns on the power (step S55) thereafter, the OPEN/CLOSE prohibition instruction is cleared, and the CAS 23 will be able to be driven. The MPU 61 then determines whether the LOAD switch is either ON or OFF (step S56). If the LOAD switch is ON, the MPU 61 executes the LOAD routine (step S57) and terminates the process.

If the LOAD switch is OFF, the MPU 61 determines whether the UNLOAD switch is either ON or OFF (step S58). If the UNLOAD switch is ON, the MPU 61 executes the UNLOAD routine (step S59) and terminates the process. If the UNLOAD switch is OFF, the MPU 61 will be in a READY state (step S60)., The loading/unloading aperture 21 can be opened at this time, and the MPU 61 performs normal operations including the driving operation of the CAS 23 (step S61), and terminates the process.

In the prohibition process shown in FIG. 27, a dishonest user turns off the power, sets the UNLOAD switch to ON, and turns on the power again, so that he or she can steal all of cartridges 1 in the device. To prevent the cartridges from being stolen, a password is assigned to the library device. If the password is not received from the host computer 46, the loading/unloading aperture 21 is made unopenable.

Figure 28:
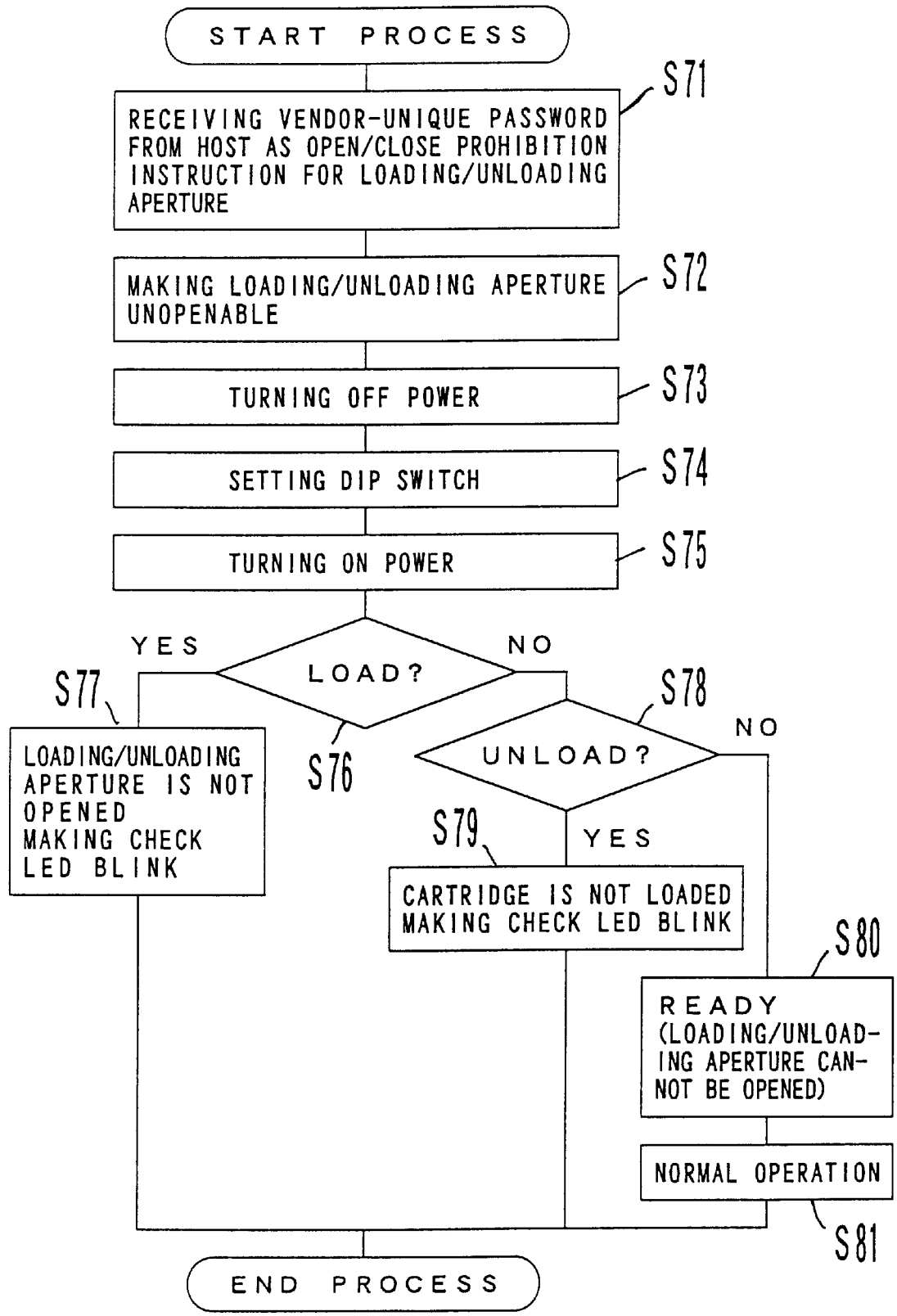
FIG. 28 is a flowchart showing a second OPEN/CLOSE prohibition process.

FIG. 28 is a flowchart showing the OPEN/CLOSE prohibition process using a password according to the first embodiment. A user first transmits a vendorunique password from the host computer 46 to the library device as the OPEN/CLOSE prohibition instruction.

When receiving the password (step S71), the MPU 61 included in the library device locks the CAS 23, and makes the loading/unloading aperture 21 unopenable (step S72). To verify whether or not the received password is correct, it may be compared with the password stored in the MAIN board 32 beforehand.

Thereafter, even if the user turns off the power (step S73), sets the DIP switch 35 (step S74), and turns on the power again (step S75), the OPEN/CLOSE instruction is not cleared, and the CAS 23 cannot be driven. Next, the MPU 61 determines whether the LOAD switch is either ON or OFF (step S76). Even if the LOAD switch is ON at this time, the CAS 23 cannot be driven. Accordingly, the loading/unloading aperture 21 cannot be opened, and the MPU 61 makes the CHECK LED blink (step S77) and terminates the process.

If the LOAD switch is OFF, the MPU 61 determines whether the UNLOAD switch is either ON or OFF (step S78). Even if the UNLOAD switch is ON, the MPU 61 does not unload a cartridge 1, makes the CHECK LED blink (step S79), and terminates the process. If the UNLOAD switch is OFF, the MPU 61 will be in a READY state (step S80). Since the loading/unloading aperture 21 cannot be opened at this time, the MPU 61 performs normal operations except for the operation for driving the CAS 23 (step S81), and terminates the process.

Figure 29:
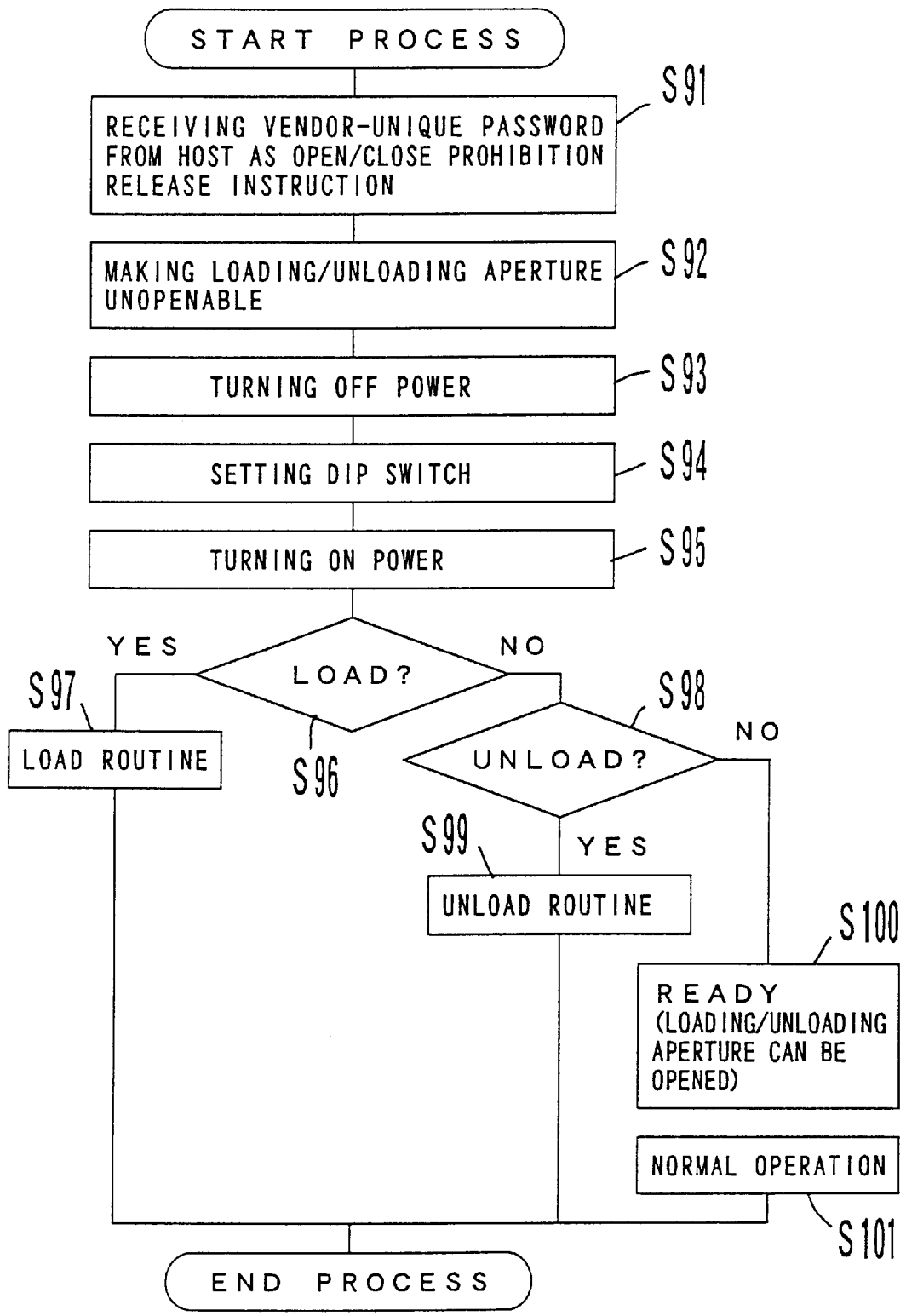
FIG. 29 is a flowchart showing an OPEN/CLOSE prohibition release process.

With the prohibition process shown in FIG. 28, the loading/unloading aperture 21 is not opened even if a user turns on the power again. As a result, a cartridge 1 can be prevented from being stolen. Only an authorized user knows the password, which is a secret from other users. To load/unload a cartridge 1, the process for releasing the OPEN/CLOSE prohibition instruction shown in FIG. 29 may be performed.

A user first transmits the above described password from the host computer 46 to the library device as the OPEN/CLOSE prohibition release instruction. When receiving the password (step S91), the MPU 61 included in the library device releases the CAS 23 from being locked, and makes the loading/unloading aperture 21 openable (step S92).

When the user turns off the power (step S93), sets the DIP switch 35 (step S94), and turns on the power again (step S95), the MPU 61 determines whether the LOAD switch is either ON or OFF (step S96). Since the CAS 23 can be driven at this time, the MPU 61 executes the LOAD routine (step S97) if the LOAD switch is ON, and terminates the process.

If the LOAD switch is OFF, the MPU 62 determines whether the UNLOAD switch is either ON or OFF (step S98). If the UNLOAD switch is ON, the MPU 61 executes the UNLOAD routine (step S99), and terminates the process. If the UNLOAD switch is OFF, the MPU 61 will be in a READY state (step S100). Since the loading/unloading aperture 21 can be opened at this time, the MPU 61 performs normal operations including the operation for driving the CAS 23 (step S101), and terminates the process.

Here, a vendor-unique password is used as the OPEN/CLOSE prohibition instruction, and the OPEN/CLOSE prohibition release instruction. However, these instructions are not limited to the vendor-unique password. Specific information determined in advance may be used as these instructions.

According to the above described embodiment, the mass loading/unloading mode is set using the DIP switch 35. However, the present invention is not limited to this implementation. An arbitrary form may be used as a setting switch. For example, LOAD/UNLOAD switches shown in FIG. 30 may be arranged on the operator panel 22. Or, a touch panel, etc. may be used.

Additionally, a command may be transmitted from the host computer 46 to the library device in order to set the mass loading/unloading mode. Furthermore, the setting of the mass loading/unloading mode and the loading/unloading processes shown in FIG. 15 may be performed in the host computer 46 so that the library device executes the LOAD/UNLOAD routines according to an instruction from the host computer 46.

Figure 31:
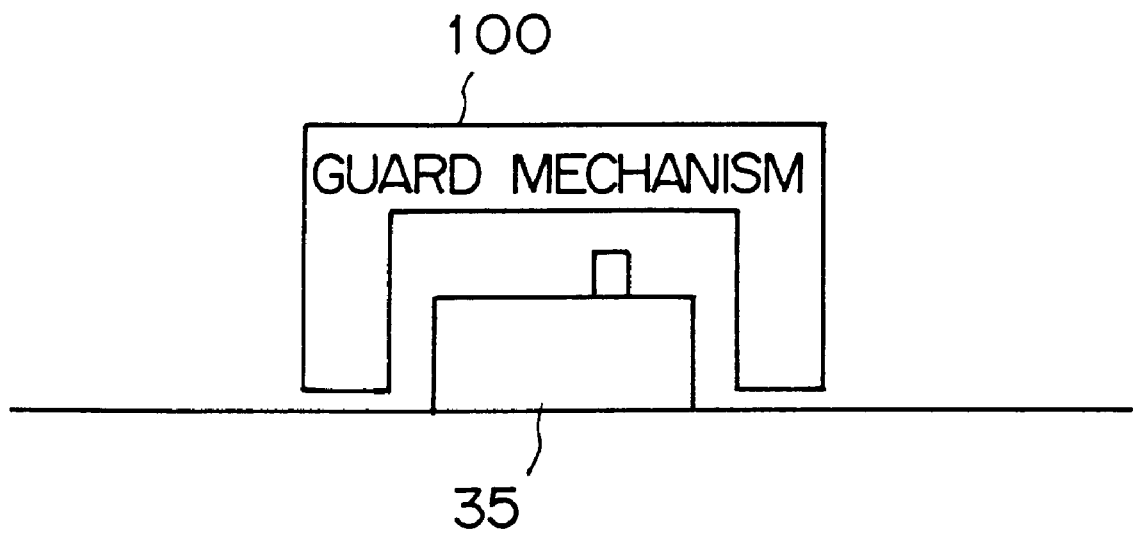
FIG. 31 shows a guard mechanism of a setting switch.

Still further, the setting switch 35 (or its terminals) for setting the mass loading/unloading mode may be mechanically guarded, as shown in FIG. 31, in order to prevent cartridges 1 in the library device from being stolen. In this case, only an authorized user holds the key to the guard mechanism 100, and other users cannot operate the switch.

According to the present invention, operations for loading/unloading a mass of storage media can be implemented without arranging a door mechanism for loading/unloading a mass of storage media even in a library device equipped with only one I/O element. Accordingly, the number of components and hardware cost can be reduced in comparison with those of a conventional device equipped with a door mechanism.

Additionally, the operability of loading/unloading of a mass of storage media is improved in comparison with the case in which a library device does not include the mass loading/unloading capability, thereby reducing a user load.

What is claimed is:

1. A controlling device for use in a library device storing a plurality of storage media, comprising:

setting means for setting at least one of a mass loading mode and a mass unloading mode of a plurality of storage media; and controlling means for controlling and enabling the library device to successively repeat a loading operation in order to load the plurality of storage media when the mass loading mode is set by said setting means, and controlling and enabling the library device to successively repeat an unloading operation in order to unload the plurality of storage media when the mass unloading mode is set by said setting means.

2. The controlling device according to claim 1, wherein said setting means includes at least one of a switching means for specifying the mass loading mode, and a switching means for specifying the mass unloading mode.

3. The controlling device according to claim 2, wherein:

said setting means includes a DIP switch for specifying at least one of the mass loading mode and the mass unloading mode; and a mode specified by the DIP switch is notified to said controlling means when the library device is powered up.

4. A controlling device for use in a library device storing a plurality of storage media, comprising:

setting means for setting a mass loading mode of a plurality of storage media; and controlling means for controlling the library device in order to successively load the a plurality of storage media when the mass loading mode is set by said setting means.

5. A controlling device for use in a library device storing a plurality of storage media, comprising:

setting means for setting a mass unloading mode of a plurality of storage media; and controlling means for controlling the library device in order to successively unload the plurality of storage media when the mass unloading mode is set by said setting means.

6. A library device for storing a plurality of storage media, comprising:

setting means for setting at least one of a mass loading mode and a mass unloading mode of a plurality of storage media; and carrying means for successively loading the plurality of storage media when the mass loading mode is set by said setting means, and successively unloading the plurality of storage media when the mass unloading mode is set by said setting means.

7. The library device according to claim 6, not being equipped with a door for loading/unloading a mass of storage media, wherein said carrying means automatically performs operations of a mode set by said setting means without being controlled from an outside of the library device.

8. The library device according to claim 6, further comprising:

displaying means for displaying at least one of a state in which the library device is operating in a mode set by said setting means, and a state in which an operation of the set mode is terminated.

9. The library device according to claim 6, further comprising:

unloading means for unloading the plurality of storage media; and communicating means for communicating with an external controlling device, wherein:

said unloading means is prohibited from operating when said communicating means receives a prohibition instruction, and said unloading means is allowed to operate when said communicating means receives a prohibition release instruction.

10. The library device according to claim 6, wherein said communicating means receives a predetermined password as at least either of the prohibition instruction and the prohibition release instruction.

11. The library device according to claim 6, wherein said setting means includes a switching means for specifying at least one of the mass loading mode and the mass unloading mode, and a guarding means for prohibiting a user operation of said switching means.

12. A controlling method for use in a library device storing a plurality of storage media, comprising the steps of:

setting at least one of a mass loading mode and a mass unloading mode of a plurality of storage media; and controlling the library device in order to successively load the plurality of storage media when the mass loading mode is set, and controlling the library device in order to successively unload the plurality of storage media when the mass unloading mode is set.

13. The controlling method according to claim 12, further comprising the steps of:

inputting a prohibition instruction to the library device; and prohibiting storage media from being unloaded until a prohibition release instruction is input.

14. A computer-readable storage medium, when used by a processing device for controlling a library device storing a plurality of storage media, for making the processing device perform the functions of:

setting at least one of a mass loading mode and a mass unloading mode of a plurality of storage media; and controlling the library device in order to successively load the plurality of storage media when the mass loading mode is set, and controlling the library device in order to successively unload the plurality of storage media when the mass unloading mode is set.

* * * * *